US008747774B2

(12) United States Patent
Doyle et al.

(10) Patent No.: US 8,747,774 B2
(45) Date of Patent: Jun. 10, 2014

(54) INTEGRATED HINGED CARTRIDGE HOUSINGS FOR SAMPLE ANALYSIS

(75) Inventors: Kevin John Doyle, Dubrobin (CA); Paul Wilkins, Cambridge (GB); Mick Withers, Impington (GB); Adrian Cooper, St. Ives (GB); John Oakey Noell, Skillman, NJ (US)

(73) Assignee: Abbott Point of Care Inc., Princeton, NJ (US)

( * ) Notice: Subject to any disclaimer, the term of this patent is extended or adjusted under 35 U.S.C. 154(b) by 453 days.

(21) Appl. No.: 12/971,834

(22) Filed: Dec. 17, 2010

(65) Prior Publication Data

US 2011/0150705 A1 Jun. 23, 2011

Related U.S. Application Data

(60) Provisional application No. 61/288,189, filed on Dec. 18, 2009.

(51) Int. Cl.
*G01N 21/75* (2006.01)

(52) U.S. Cl.
USPC .......................................................... 422/402

(58) Field of Classification Search
CPC .......... C12Q 1/68; C12Q 1/686; G01N 33/48; G01N 21/00; G01N 21/64; G01N 27/00; G01N 27/30; G01N 1/38; G01N 35/10; G01N 21/75; B29C 53/00; B29C 45/00; B29C 45/14; B29C 69/00; B01L 7/52
USPC .......................................................... 422/402
See application file for complete search history.

(56) References Cited

U.S. PATENT DOCUMENTS

| | | | |
|---|---|---|---|
| 3,853,467 | A | 12/1974 | Giaever |
| 4,444,711 | A | 4/1984 | Schad |
| 4,460,534 | A | 7/1984 | Boehm et al. |
| 4,686,479 | A | 8/1987 | Young et al. |
| 4,830,959 | A | 5/1989 | McNeil et al. |
| 4,954,087 | A | 9/1990 | Lauks et al. |
| 4,997,526 | A | 3/1991 | Robblee |
| 5,063,081 | A | 11/1991 | Cozzette et al. |
| 5,081,063 | A | 1/1992 | Vonno et al. |
| 5,096,669 | A | 3/1992 | Lauks et al. |
| 5,112,455 | A | 5/1992 | Cozzette et al. |

(Continued)

FOREIGN PATENT DOCUMENTS

| | | | |
|---|---|---|---|
| JP | 5-273212 | A | 10/1993 |
| JP | 7-260782 | A | 10/1995 |

(Continued)

OTHER PUBLICATIONS

International Search Report and Written Opinion for PCT/US2010/061070 dated Mar. 29, 2011.

(Continued)

*Primary Examiner* — Lore Jarrett

(57) ABSTRACT

The invention relates to a cartridge housing for forming a cartridge capable of measuring an analyte or property of a liquid sample. The housing comprising a first substantially rigid zone, a second substantially flexible zone, a hinge region, and at least one sensor recess containing a sensor. The housing is foldable about said hinge region to form a cartridge having a conduit over at least a portion of said sensor. The invention also relates to methods for forming such cartridges and to various features of such cartridges.

88 Claims, 12 Drawing Sheets

(56) References Cited

U.S. PATENT DOCUMENTS

| | | | |
|---|---|---|---|
| 5,200,051 | A | 4/1993 | Cozzette et al. |
| 5,208,649 | A | 5/1993 | Cuppoletti et al. |
| D337,164 | S | 7/1993 | Lauks et al. |
| 5,254,315 | A | 10/1993 | Nurse et al. |
| 5,447,440 | A | 9/1995 | Davis et al. |
| 5,500,187 | A | 3/1996 | Deoms et al. |
| 5,514,253 | A | 5/1996 | Davis et al. |
| 5,597,532 | A | 1/1997 | Connolly |
| 5,628,961 | A | 5/1997 | Davis et al. |
| 5,638,828 | A | 6/1997 | Lauks et al. |
| 5,652,149 | A | 7/1997 | Mileaf et al. |
| 5,653,243 | A | 8/1997 | Lauks et al. |
| 5,656,504 | A | 8/1997 | Johansson et al. |
| 5,666,967 | A | 9/1997 | Lauks et al. |
| 5,779,650 | A | 7/1998 | Lauks et al. |
| 5,807,752 | A | 9/1998 | Brizgys et al. |
| 5,821,399 | A | 10/1998 | Zelin |
| 5,846,490 | A | 12/1998 | Yokota et al. |
| 6,010,463 | A | 1/2000 | Lauks et al. |
| 6,030,827 | A | 2/2000 | Davis et al. |
| 6,033,914 | A | 3/2000 | Boyd et al. |
| 6,106,778 | A | 8/2000 | Oku et al. |
| 6,296,796 | B1 | 10/2001 | Gordon |
| 6,379,883 | B2 | 4/2002 | Davis et al. |
| 6,395,235 | B1 | 5/2002 | Kilcoin et al. |
| 6,436,699 | B1 | 8/2002 | Berggren et al. |
| 6,475,372 | B1 | 11/2002 | Ohara et al. |
| 6,478,938 | B1 | 11/2002 | Paek et al. |
| 6,750,053 | B1 | 6/2004 | Opalsky et al. |
| 7,213,720 | B2 | 5/2007 | Giraud |
| 7,263,501 | B2 | 8/2007 | Tirinato et al. |
| 7,419,821 | B2 | 9/2008 | Davis et al. |
| 7,537,137 | B2 | 5/2009 | Giraud |
| 7,712,610 | B2 | 5/2010 | Tissington et al. |
| 2002/0019062 | A1 | 2/2002 | Lea et al. |
| 2002/0155033 | A1 | 10/2002 | Strand et al. |
| 2003/0059954 | A1 | 3/2003 | Vikholm et al. |
| 2003/0170881 | A1 | 9/2003 | Davis et al. |
| 2003/0224531 | A1 | 12/2003 | Brennen et al. |
| 2005/0054078 | A1 | 3/2005 | Miller et al. |
| 2008/0110894 | A1 | 5/2008 | Tissington et al. |
| 2009/0065368 | A1 | 3/2009 | Davis et al. |
| 2010/0068097 | A1 | 3/2010 | Ade et al. |

FOREIGN PATENT DOCUMENTS

| | | | |
|---|---|---|---|
| WO | WO 03/076937 | A2 | 9/2003 |
| WO | WO 2006/041383 | | 4/2006 |
| WO | WO 2007/072009 | A2 | 6/2007 |
| WO | WO 2008030920 | | 7/2008 |

OTHER PUBLICATIONS

International Search Report, PCT/US2010/061070, Mar. 29, 2011, 5 pages.

Written Opinion of the International Searching Authority, PCT/US2010/061070, Mar. 29, 2011, 7 pages.

Eddowes, M. J., "Direct Immunochemical Sensing: Basic Chemical Principles and Fundamental Limitations", Biosensors, 3: pp. 1-15, 1987.

Laurell, C. B., "Electroimmunoassay", Methods in Enzymology, vol. 73, Academic Press, New York, pp. 339, 340, 346-348, 1981.

Green, M. J., "Electrochemcial Immunoassays", Phil. Trans. R. Soc. Lond., 316: pp. 135-142, 1987.

International Search Report PCT/US2004/029502, Aug. 2, 2006, 4 pages.

Written Opinion of the International Searching Authority, PCT/US2004/029502, Aug. 2, 2006, 3 pages.

International Preliminary Report on Patentability for PCT/US2010/061070 mailed Jun. 28, 2012.

Chinese Office Action for corresponding Chinese Appl. No. 201080050392.2 dated Jan. 24, 2014.

INTEGRATED HINGED CARTRIDGE HOUSINGS FOR SAMPLE ANALYSIS

CROSS REFERENCE TO RELATED APPLICATION

This application claims priority to U.S. Provisional Application No. 61/288,189, filed Dec. 18, 2009, the entirety of which is incorporated herein by reference.

FIELD OF THE INVENTION

The invention relates to medical devices. Specifically, the invention relates to integrated, hinged cartridges for performing medical analyses by various assay techniques including immunoassays to determine analyte content or concentration, among other medical analyses and tests.

BACKGROUND OF THE INVENTION

Traditionally, testing of blood or other body fluids for medical evaluation and diagnosis was the exclusive domain of large, well-equipped central laboratories. While such laboratories offer efficient, reliable, and accurate testing of a high volume of fluid samples, they cannot offer rapid turn-around of results to enable more immediate medical decision making. A medical practitioner typically must collect samples, transport them to a laboratory, wait for the samples to be processed and then wait for the results to be communicated. Even in hospital settings, the handling of a sample from the patient's bedside to the hospital laboratory produce significant delays. This problem is compounded by the variable workload and throughput capacity of the laboratory and the compiling and communicating of data.

The introduction of point-of-care blood testing systems enabled practitioners to obtain immediate blood test results while examining a patient, whether in the physician's office, the hospital emergency room, or at the patient's bedside. To be effective, a point-of-care analysis device must provide error-free operation for a wide variety of tests in relatively untrained hands. For optimum effectiveness, a real-time system requires minimum skill to operate, while offering maximum speed for testing, appropriate accuracy and system reliability, as well as cost effective operation.

A notable point-of-care system (The i-STAT® System, Abbott Point of Care Inc., Princeton, N.J.) is disclosed in U.S. Pat. No. 5,096,669 which comprises a disposable device, operating in conjunction with a hand-held analyzer, for performing a variety of measurements on blood or other fluids. The disposable device, reproduced in FIG. 1, is constructed to serve a multiplicity of functions including sample collection and retention, sensor calibration and measurement. In operation, the disposable device is inserted into a hand-held reader or instrument, which provides the electrical connections to the sensors and automatically controls the measurement sequence without operator intervention. The disposable device includes an upper piece 90 and a lower plastic piece 12 in which are mounted a plurality of sensors 66 with electrical contacts and a pouch 60 containing a sensor-standardization or calibrant fluid. The sensors generate electric signals based on the concentration of specific chemical species in the fluid sample. A double sided adhesive sheet 74 is situated between the upper piece 90 and the lower piece 12 to bond them together and to define and seal several cavities and conduits within the device.

In the '669 disclosure, a cavity 18 is located at the center of the device having a sealed pouch 60 containing calibrant fluid. A first conduit 24 leads from this cavity 18 toward the sensors 66. A second conduit 92 has an orifice at one end for the receipt of a sample while the other end of the tube terminates at a capillary break 96. A third conduit 94 leads from the capillary break 96 across the sensors 66 to a second cavity 20 which serves as a sink. The first conduit 24 joins the third conduit 94 after the capillary break 96 and before the sensors 66. A third cavity 22 functions as an air bladder. When the air bladder is actuated, the air is forced down a fourth conduit (see FIG. 2 of the '669 patent) and into the second conduit 92.

In operation, a fluid sample is drawn into the second conduit 92 by capillary action by putting the orifice at one end of the second conduit in contact with the sample. After the sample fills the second conduit, the orifice is sealed off. The pouch 60 containing the calibrant fluid is then pierced and the calibrant fluid flows from the cavity through the first conduit 24 to the third conduit 94 and across the sensors 66 at which time sensor calibration is performed. Next, the air bladder is actuated by the instrument forcing air down the fourth conduit to one end of the second conduit 92 which forces the sample out of the other end of the conduit, past a capillary break 96, and into the third conduit 94 and across the sensors 66 where measurements are performed. As this is done, the calibration fluid is forced out the third conduit 94 into the second cavity 20 where it is held. Once the measurements are made, the disposable device can be discarded.

The hand-held reader includes an opening in which the disposable device is received. After the disposable device is inserted into the reader, the reader engages the electrical contacts on the disposable device, ruptures the pouch, calibrates the sensors, actuates the air bladder to force the fluid sample across the sensors, records the electric signals produced by the sensors, calculates the concentration of the chemical species tested and displays the information. Upon completion of the process, the user removes the device from the reader and simply disposes of it. The reader is then ready to perform another measurement, which is initiated by the insertion of another disposable device. Note that alternative cartridge fluidic systems that permit performing immunoassays and coagulation measurements using similar instrument format are described in jointly owned U.S. Pat. No. 7,419,821, U.S. Pat. No. 6,750,053 and U.S. Pat. No. 5,447,440, all of which are incorporated herein by reference in their entireties.

While use of the '669 invention, described above, is particularly advantageous in the point-of-care medical environment, there remains a need for single-use blood testing devices that are simpler to manufacture, assemble and use.

SUMMARY OF THE INVENTION

The present invention, in one embodiment, is directed to a cartridge, e.g., single-use disposable cartridge, for measuring an analyte or property of a liquid sample, the cartridge comprising a molded housing having a first substantially rigid zone and a second substantially flexible zone. In addition, the housing has a hinge region and at least one sensor recess containing one or more sensors. In the assembly of the device, the housing is folded at the hinge region to form a cartridge having a conduit over at least a portion of the sensor, and optionally other conduits in other parts of the cartridge.

In another embodiment, the invention is to a method of making a test cartridge for measuring an analyte or property of a liquid sample by molding a housing comprising a first substantially rigid zone and a second substantially flexible zone, wherein the housing has a hinge region and the substantially flexible zone has at least one sensor recess. This is followed by inserting a sensor into the recess and folding the housing at the hinge region to oppose and seal the housing to seal the cartridge and form a conduit over at least a portion of the sensor.

In another embodiment, the invention is to a cartridge housing for forming a cartridge capable of measuring an analyte or property of a liquid sample, the housing comprising a first substantially rigid zone, a second substantially flexible zone, a hinge region, and at least one sensor recess containing a sensor, wherein said housing is foldable about said hinge region to form a cartridge having a conduit over at least a portion of said sensor. The invention is also directed to a cartridge comprising the cartridge housing in a closed position.

In another embodiment, the invention is to a method of making a test cartridge for measuring an analyte or property of a liquid sample, the method comprising the steps of: (a) molding, e.g., injection molding, a housing comprising a first substantially rigid zone and a second substantially flexible zone, wherein said housing has a hinge region and said substantially flexible zone has at least one sensor recess; (b) inserting a sensor into said sensor recess; (c) folding said housing at said hinge region; and (d) sealing said housing in a closed position, wherein said sealing forms the cartridge, and the cartridge comprises a conduit over at least a portion of said sensor. The substantially rigid zone preferably is formed in a first injection molding step and the substantially flexible zone is formed in a second injection molding step. The method preferably further comprises inserting a pouch containing a fluid into the housing, before step (c).

In another embodiment, the invention is to a sample analysis cartridge, comprising: (a) a housing having a sample entry orifice for receiving a fluid sample; (b) a holding chamber disposed between the sample entry orifice and a capillary stop for forming a metered sample therebetween, wherein the capillary stop is formed of opposing housing portions and a substantially flexible portion disposed therebetween to seal said opposing housing portions in a liquid-tight manner; and (c) a conduit disposed between the capillary stop and a sensor and being configured to deliver the metered sample from the capillary stop to the sensor. The holding chamber optionally has a ramped region in which the lateral cross-sectional area decreases in a distal direction from the sample entry orifice to the capillary stop. The ramped region, for example, may extend over at least 20 percent, at least 50 percent, or at least 75 percent of the length of the holding chamber. The ramped region preferably comprises a ramp element on at least one of the top surface or the bottom surface of the holding chamber and the side walls of the holding chamber preferably narrow at the capillary stop. In one aspect, the housing comprises a top housing portion defining a top portion of the holding chamber, a bottom housing portion defining a bottom portion of the holding chamber, and the top portion and the bottom portion are sealed together with one or more mating elements to form the holding chamber.

In another embodiment, the invention is to a cartridge capable of measuring an analyte or property of a liquid sample, comprising: (a) a sample entry orifice for receiving the liquid sample; (b) a top housing portion defining a top portion of a conduit; (c) a bottom housing portion defining a bottom portion of the conduit, wherein the top portion and the bottom portion are sealed together with one or more mating elements to form the conduit, wherein at least one of the top portion or the bottom portion includes a flexible sealing ridge for sealing opposing portions of the conduit; and (d) a sensor for detecting the analyte or property of the liquid sample.

In another embodiment, the invention is a molded housing, comprising a substantially rigid zone (on both sides of a hinge), a substantially flexible zone, and a hinge, wherein the housing is foldable at the hinge to form a fluid channel, and wherein at least a portion of the substantially flexible zone forms a channel seal, optionally a liquid-tight seal or an air-tight seal. Accordingly, in another embodiment, the invention is to a cartridge, comprising a molded housing comprising a substantially rigid zone, a substantially flexible zone, and a hinge, wherein the housing is folded about the hinge to form a fluid channel, and wherein at least a portion of the substantially flexible zone forms a channel seal. In still another embodiment, the invention is to a method for forming a cartridge, comprising: (a) providing a molded housing comprising a substantially rigid zone, a substantially flexible zone, and a hinge; and (b) folding the housing at the hinge to form a fluid channel, wherein at least a portion of the substantially flexible zone forms a channel seal. The housing preferably is a two-shot molded housing. Optionally, at least a portion of the substantially rigid zone is optically transparent. At least a portion of the fluid channel may form a cuvette. Optionally, the fluid channel has reagents for an optical assay.

In each embodiment, the cartridge preferably has an unfolded position comprising a top portion and a bottom portion, wherein the top portion and the bottom portion are connected by the hinge region. Preferably, the top portion forms a top portion of the conduit and the bottom portion forms a bottom portion of the conduit, and the conduit is formed upon folding of the housing about the hinge region. At least one of the substantially rigid zone or the substantially flexible zone may comprise a single contiguous zone or a plurality of non-contiguous zones.

The sensor recess may be in a portion of said substantially flexible zone and/or a portion of the substantially rigid zone. For example, the sensor recess may be in a portion of said substantially flexible zone and/or of said substantially rigid zone forming a liquid-tight seal around a perimeter of the sensor. The seal, for example, may be formed by at least one of glue, a perimeter of formable resin, e.g., epoxy, or a dielectric grease. In one aspect, the sensor recess contains a sensor array comprising a plurality of sensors for a plurality of analytes. The sensor preferably is selected from the group consisting of electrochemical, amperometric, conductimetric, potentiometric, optical, absorbance, fluorescence, luminescence, piezoelectric, surface acoustic wave and surface plasmon resonance sensors.

In preferred aspects, the substantially rigid zone comprises a material selected from the group consisting of PETG, ABS, polycarbonate, polystyrene, Topaz, acrylic polymers, PMMA and combinations thereof. The substantially flexible zone preferably comprises a thermoplastic elastomer, more preferably an injection moldable thermoplastic elastomer having a modulus of elasticity at 100% strain as determined by ASTM D638 of from 0.1 to 6 MPa.

The hinge region of the housing and cartridge preferably comprises portions of the substantially rigid zone and of the substantially flexible zone. In one aspect, the hinge region has a hinge region axis and the sensor recess has a sensor recess axis, and the hinge region axis is substantially parallel to the sensor recess axis. In another embodiment, the hinge region has a hinge region axis and the sensor recess has a sensor recess axis, and the hinge region axis is substantially orthogonal to the sensor recess axis.

The housing preferably comprises one or more mating elements on either or both sides of said hinge region, and the folding engages said mating elements in a secure manner to form said conduit. The opposing mating elements, for example, may be matable by hot staking, cold staking or by a snap closure. Additionally or alternatively, the mating elements may be secured with glue to form said conduit. In another aspect, the housing comprises one or more welding regions on either or both sides of said hinge region, and the folding engages said welding regions so that they are configured such that they may be welded together in a secure manner to form said conduit. The welding may be selected from the group consisting of ultrasonic welding, laser welding and thermal welding.

In a preferred aspect, the cartridge further comprises a pouch containing a fluid, e.g., a calibrant fluid, wash fluid, or reactant, said pouch being in fluid communication with said conduit. The cartridge also preferably comprises a pneumatic pump connected to said conduit. The pump may comprise a displaceable membrane formed by a portion of said substantially flexible zone of said housing.

A portion of said substantially flexible zone preferably forms a gasket defining the position of said conduit. For example, a portion of said substantially flexible zone may form a gasket defining the geometry and dimensions of said conduit. The gasket preferably further comprises a compliant sealing ridge. Additionally, a portion of said substantially flexible zone preferably forms an ergonomic thumb well.

The conduit in the cartridge preferably comprises a sealable sample entry port, a sample holding chamber, a sensing region and a waste chamber. The cross-sectional area of a portion of the sample holding chamber optionally decreases distally with respect to the sample entry port. In one aspect, the conduit further comprises a sealable sample entry port wherein a portion of said substantially rigid zone forms a sealing member and a portion of said substantially flexible zone forms a perimeter seal around said sample entry port, wherein said sealing member is engageable with said perimeter seal. The conduit optionally further comprises a sealable sample entry port and a vent hole.

BRIEF DESCRIPTION OF THE DRAWINGS

The present invention will be better understood in view of the appended non-limiting figures, in which.

DETAILED DESCRIPTION OF THE PREFERRED EMBODIMENTS

Foldable Immunoassay Cartridges

Figure 1:
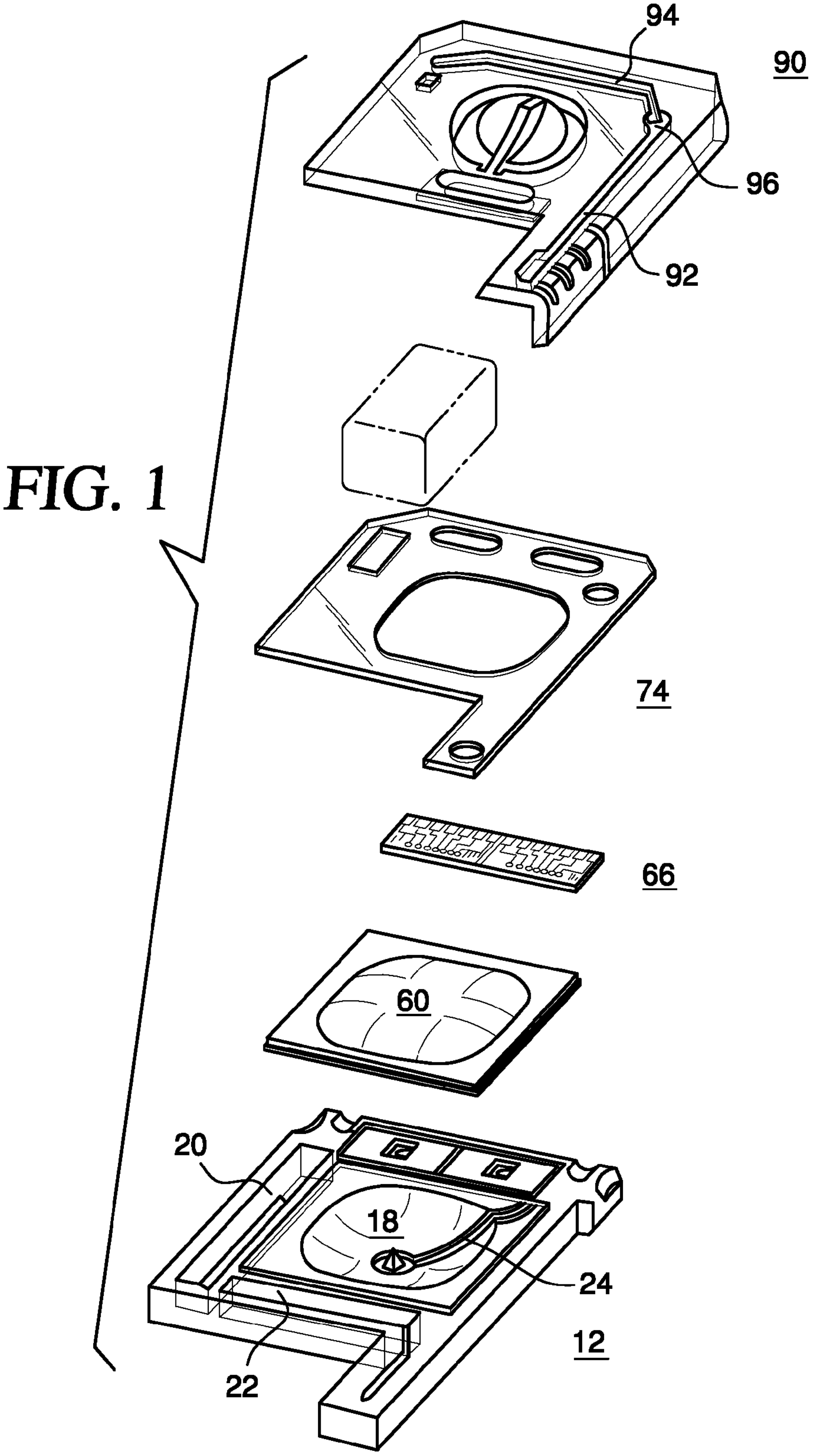
FIG. 1 is an exploded view of the disposable device disclosed in U.S. Pat. No. 5,096,669.
Figure 2:
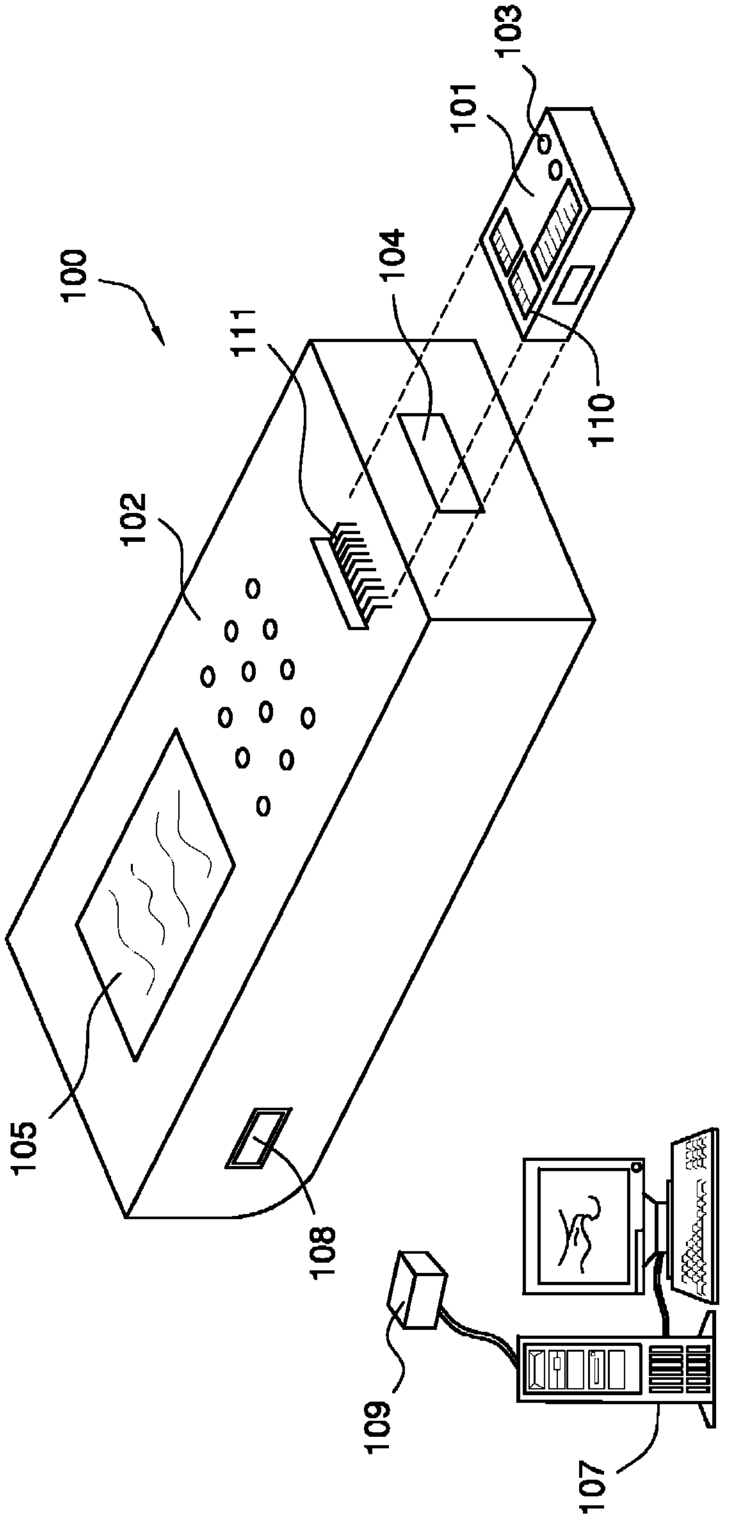
FIG. 2 is an isometric view of a disposable sensing device and reader according to one embodiment of the invention.

Referring to FIG. 2, the system 100 of the present invention comprises a self-contained disposable sensing device or cartridge 101 and a reader or instrument 102. A fluid sample to be measured is drawn into a sample entry orifice or port 103 in the device and the device is inserted into the reader through a slotted opening 104. Measurements performed by the reader are output to a display 105 or other output device, such as a printer or data management system 107 via a port on the reader 108 to a computer port 109. Transmission can be via Wifi, Bluetooth link, infrared and the like. Note that where the sensors are based on electrochemical principles of operation, the sensors 110 in the cartridge 101 make electrical contact with the instrument 102 via an electrical connector 111. For example, the connector may be of the design disclosed in jointly owned U.S. Pat. No. 4,954,087, incorporated herein by reference in its entirety. The instrument 102 may also include a method for automatic fluid flow compensation in the cartridge 101, as disclosed in jointly owned U.S. Pat. No. 5,821,399, which also is incorporated herein by reference in its entirety.

The present invention is best viewed as an improvement over a blood testing cartridge based on two separate plastic parts (a base and cover) held together by double-sided adhesive. See, e.g., U.S. Pat. No. 5,096,669 and U.S. Pat. No. 7,419,821, both of which are incorporated herein by reference in their entireties. In contrast to the devices described in ’669 and ’821 patent disclosures, however, the present invention is based on devices having a single hinged plastic part made of two different materials, preferably formed in a two-shot molding process. The single hinged plastic part is folded about the hinge region thereof and bonded in the closed position to form a cartridge without the need for a double-sided adhesive layer.

A principle benefit of this approach over the prior art is that it avoids the need to mold two separate parts independently and join them together at a later point in manufacture. In addition, where the devices are manufactured in high volume, e.g., on the order of many millions of parts per year, it is common that multiple mold cavities are used for each part, typically 2, 4, 8 etc. Subtle differences can occur between these ostensibly identical mold cavities, either at the time of machining or associated with wear during use. Furthermore, the slight shrinkage that occurs when the part is released from the mold may differ between molds. As a result, the parts may have subtle differences that must be accounted for in the overall manufacturing tolerance budget. Using the present folded cartridge concept substantially ameliorates these issues by ensuring that both the base and cover components are molded together at the same time and under the same conditions. In addition, this approach enables the inclusion of self-registration features, e.g., prong and hole features as described in connection with FIGS. 6A-6C, below, allowing for an improvement in overall manufacturing process yield.

Figures 3A, 3B:
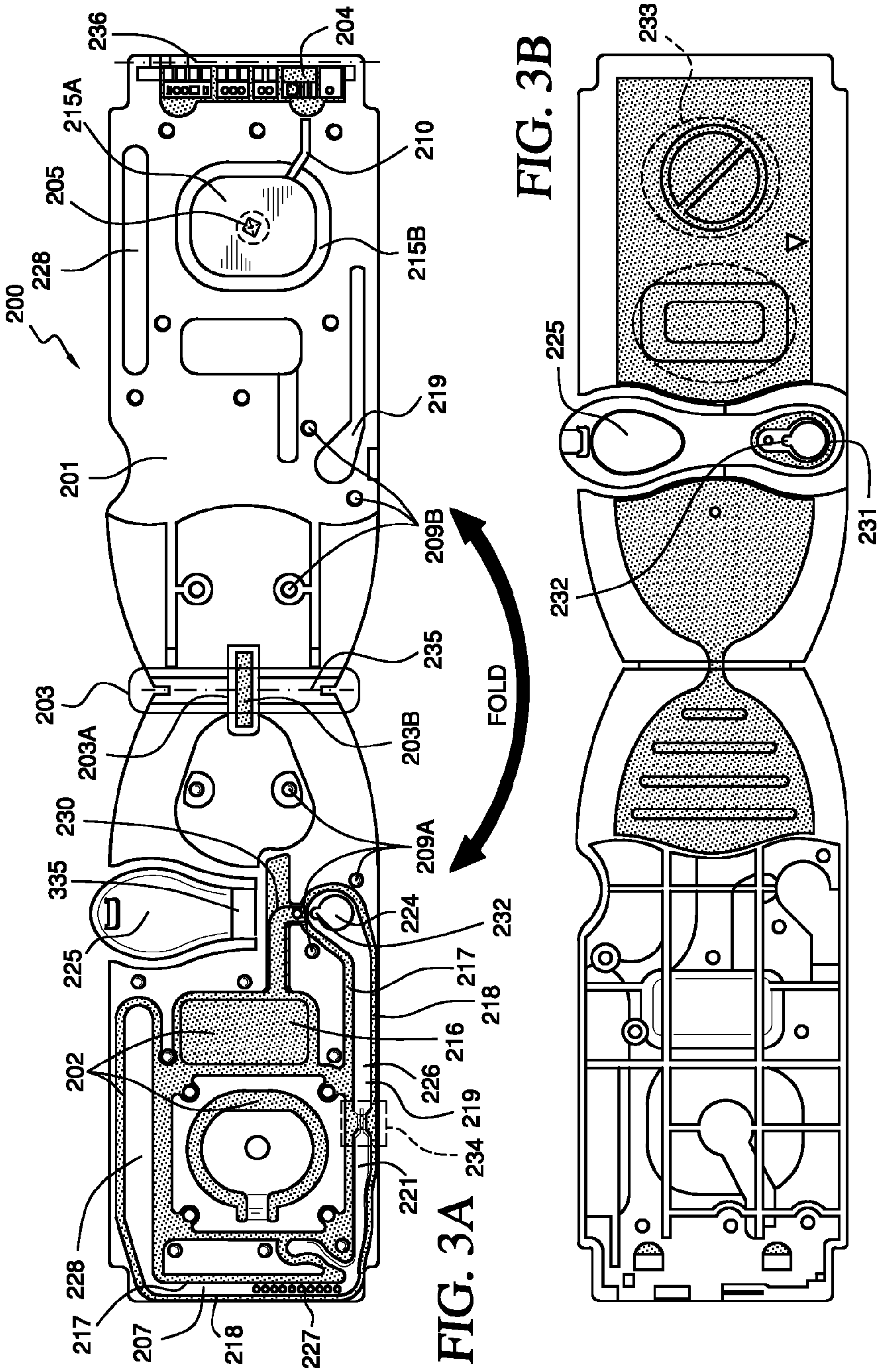
FIGS. 3A and 3B illustrate top and bottom views, respectively, of a cartridge in an open position prior to being folded according to one embodiment of the invention.
Figures 10A, 10B:
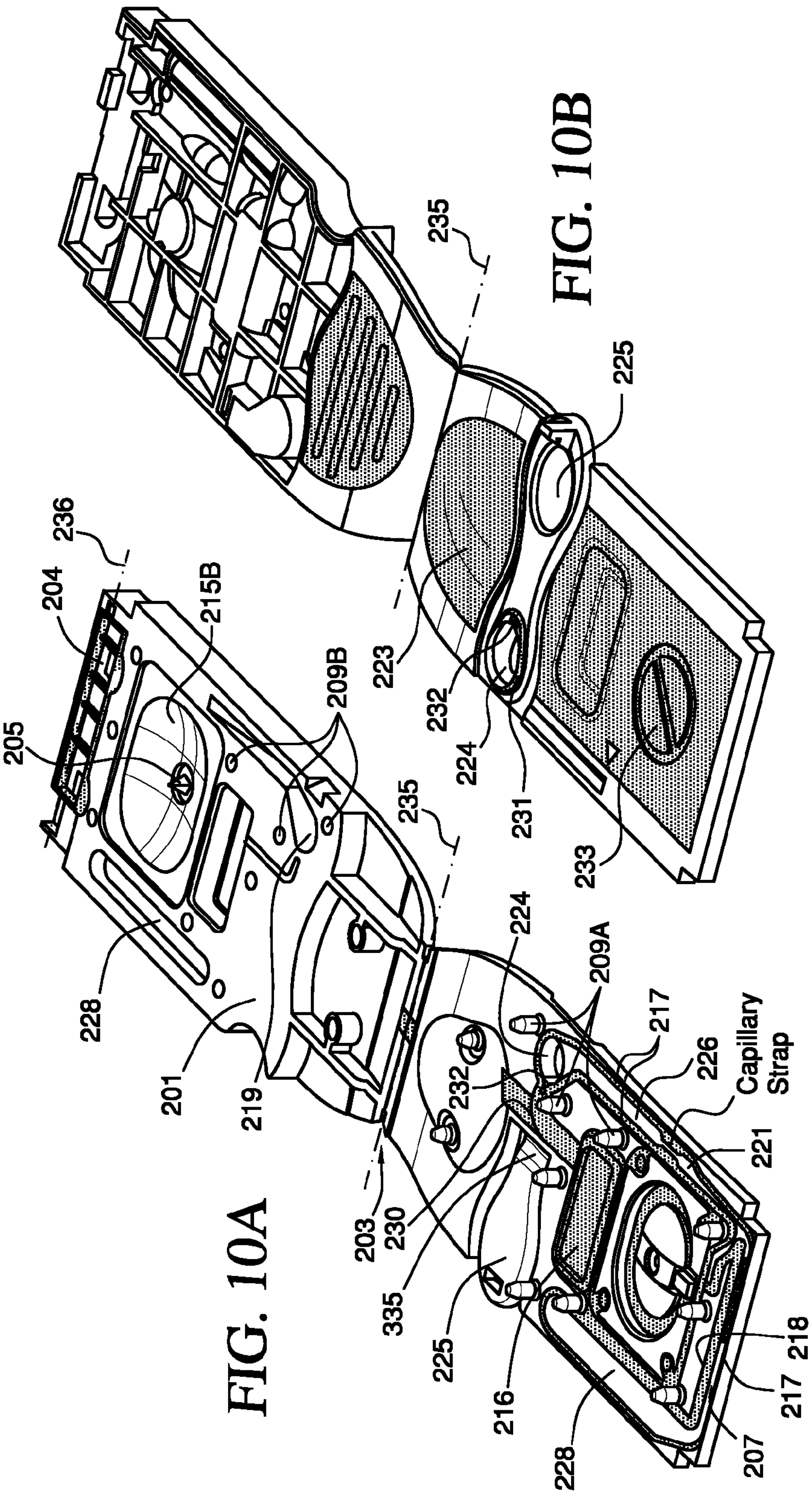
FIGS. 10A and 10B illustrate top and bottom perspective views, respectively, of a cartridge in an open position prior to being folded according to one embodiment of the invention.

As shown in FIG. 3A and FIG. 10A, the cartridge housing 200 has a hinge region 203 and at least one sensor recess 204 containing a sensor. The housing is folded at the hinge region to form a cartridge 206, in closed position, as shown in FIG.

4, with a conduit 207 over at least a portion of said sensor. A principle advantage over the concept of the '669 patent is that the present design eliminates the need for a separate adhesive gasket to attach the two halves of a cartridge, although it should be understood that in some embodiments, a gasket, optionally an adhesive gasket, may be employed with the hinged cartridges of the invention. Here, the molded substantially flexible zone or portion preferably is able to act effectively as a gasket forming one or more conduits when matted against a complimentary substantially rigid zone or portion of the housing. An additional advantage is that the present invention, in some embodiments, substantially simplifies manufacture by partially or entirely eliminating a component, i.e., the adhesive tape, described in the '669 patent.

Figure 4:
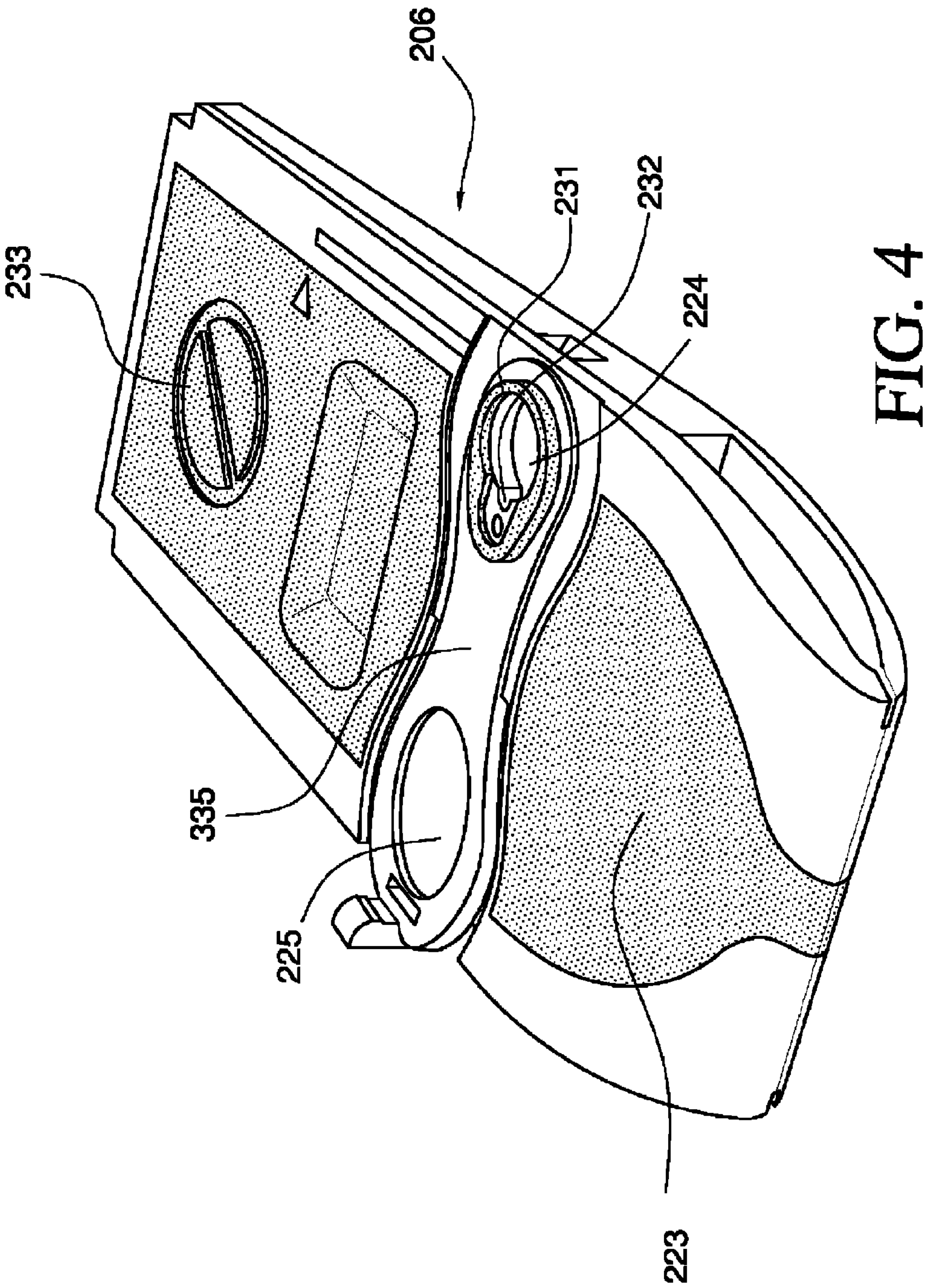
FIG. 4 is a perspective view of a cartridge in the closed position according to one embodiment of the invention.
Figure 5:
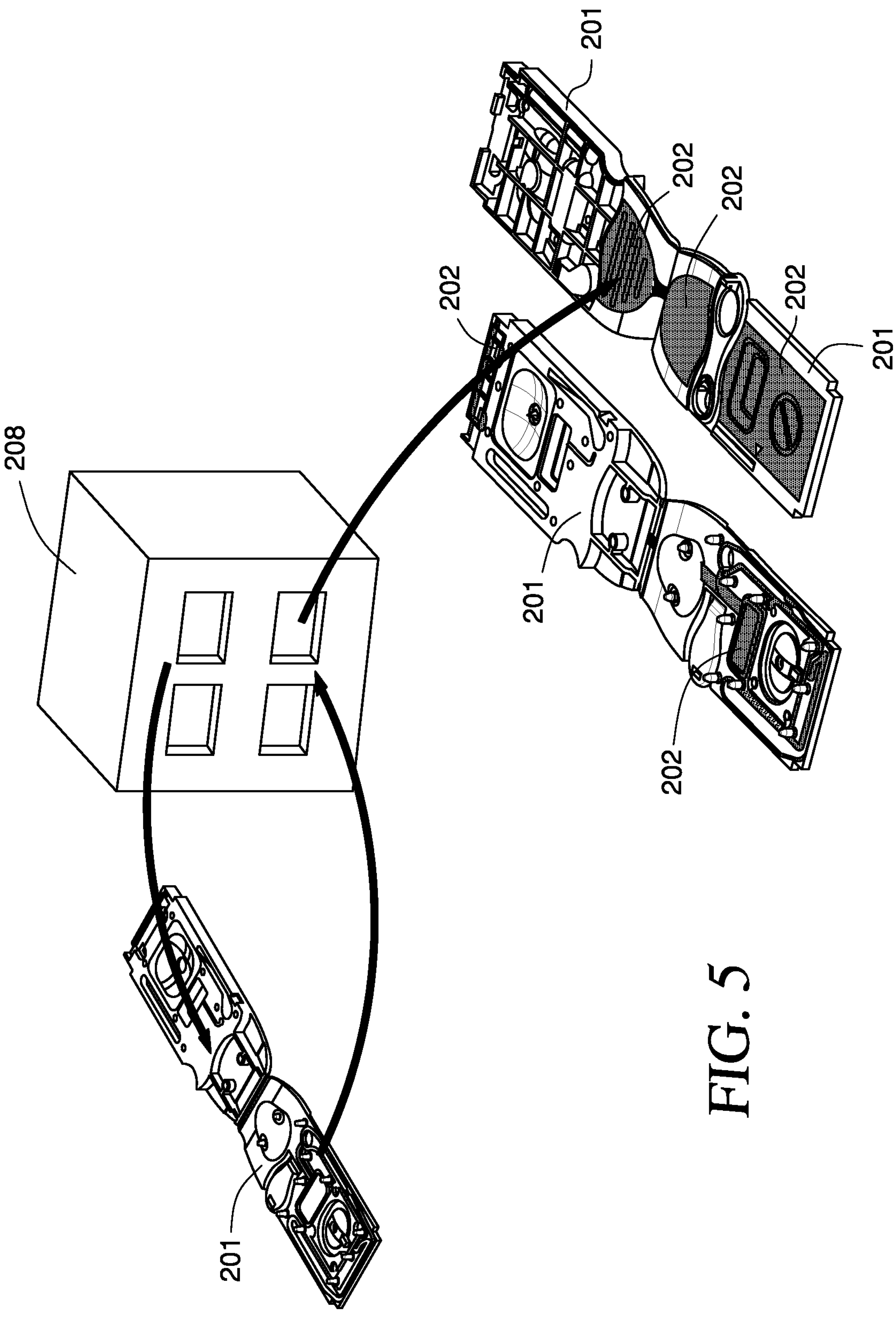
FIG. 5 provides perspective views of cartridges in various stages of construction according to one embodiment of the invention.

The housing of the cartridge preferably is injection molded as shown, for example, by machine 208 in FIG. 5. Preferably, the cartridge housing is injection molded where substantially rigid zone 201 is formed in a first injection molding step and the substantially flexible zone 202 is formed in an additional injection molding step. As seen in FIGS. 3-5, the substantially rigid zone is preferably a single contiguous zone; however, the molding process can provide a plurality of non-contiguous substantially rigid zones. The substantially flexible zones are preferably a set of several non-contiguous zones. For example, the substantially flexible zone around the sensor, i.e., in the sensor recess, may be separate and distinct from the substantially flexible zone at the hinge or sample entry port. Alternatively, the substantially flexible zone may comprise a single contiguous zone.

With regard to overall dimensions, the preferred embodiment of the molded part shown in FIG. 3A and FIG. 10A is about 10.0 cm×3.0 cm×0.2 mm and folds, as shown in FIG. 4, to give a cartridge of dimensions about 5.0 cm×3.0 cm×0.4 cm. In terms of ranges, the device optionally has a length of from 1 to 50 cm, e.g., from 5 to 15 cm, a width of from 0.5 to 15 cm, e.g., from 1 to 6 cm, and a thickness of from 0.1 to 2 cm, e.g., from 0.1 to 1 cm.

In a preferred embodiment, the cartridge housing comprises a sensor recess 204 in a portion of the substantially flexible zone. This is because the sensor (preferably of a size of about 0.3×0.4 cm) that is disposed in the sensor recess 204 preferably is made on a silicon wafer substrate, which is relatively brittle. Thus, providing a substantially flexible sensor recess 204 results in a suitable support that protects the sensor from cracking during assembly. Note that other non-silicon based sensors may be used, e.g., those made on a plastic substrate; however, the preferred embodiment uses sensors of the type described in U.S. Pat. Nos. 5,200,051; 5,514,253 and 6,030,827, the entireties of which are incorporated herein by reference. In addition to being substantially flexible, sensor recess 204 is best selected to form a liquid-tight seal around the sensor perimeter, thereby ensuring that liquids do not leak out of the conduit that covers the sensor in the fully assembled cartridge.

Figure 11:
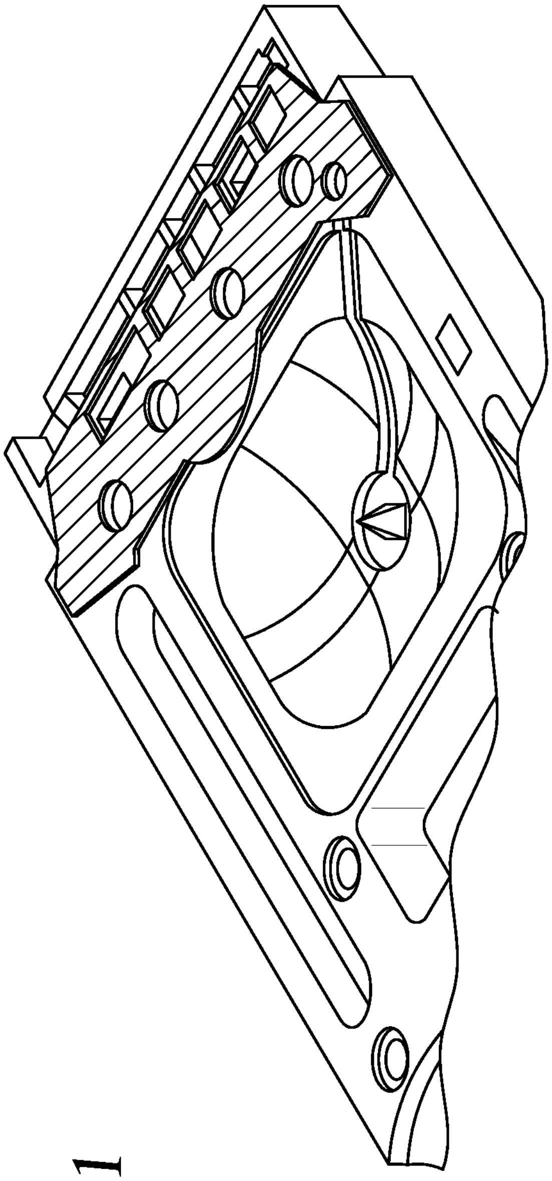
FIG. 11 is a perspective view of a cartridge according to an embodiment of the invention showing an optional electrode gasket layer.
Figure 12:
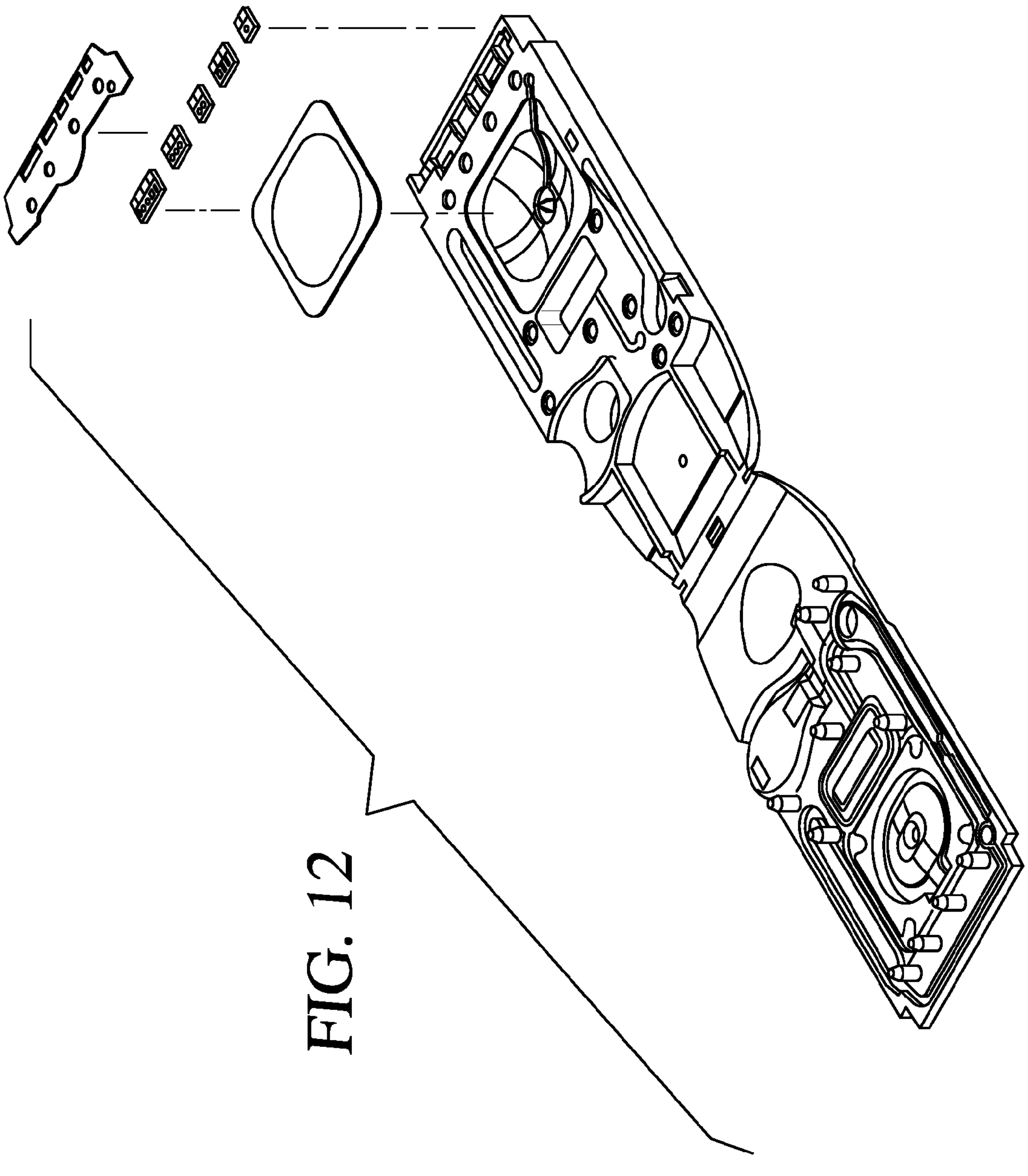
FIG. 12 illustrates an exploded view of a foldable cartridge including the optional gasket layer of FIG. 11.

In an alternative embodiment, sensor recess 204 can be formed in a portion of the substantially rigid zone. In this aspect, the liquid-tight seal optionally may be formed by a localized adhesive tape, or a gasket material preferably formed of a thermoplastic elastomer (TPE), or alternatively by a bead of glue, a perimeter of formable resin, e.g., epoxy, or a dielectric grease or a peripheral ridge formed of the substantially flexible material. In a preferred embodiment, a TPE gasket is employed. The TPE gasket may cover substantially the entire area between the cover and base of the foldable cartridge or may be localized over and between the chips, as shown in FIGS. 11 and 12. The gasket may or may not have an adhesive surface, and may have an adhesive surface on both sides thereof, i.e., forming a double-sided adhesive layer.

While the present invention is mainly described in terms of a cartridge that includes a sensor, the method of using a folded housing based on a combination of substantially rigid and substantially flexible materials is more broadly applicable to diagnostic and monitoring devices. For example, one or more portions of the substantially rigid zones may be made of an optically transparent plastic to permit light generated by an assay reaction to reach a detector included in the reader device. Alternatively, opposing portions of the substantially rigid zones may form a "cuvette" in the channel, where the reader measures absorbance at one or more wavelength in the cuvette. Note that the height (or pathlength) of the cuvette and its reproducibility from device-to-device, may be controlled by the repeatable molding process, the use of staking elements of defined height and the degree of deformability of the substantially flexible material. For example, two substantially rigid zones may be abutted during folding and staked, with adjacent portions of the substantially flexible material forming the seal. Optical assays may include, for example, metabolite assays, e.g., glucose and creatinine, immunoassays, e.g., troponin and BNP, and nucleotide assays, e.g., DNA, ssDNA, mRNA. Optical assay principles may include fluorescence, luminescence, absorbance and emission.

Figure 9:
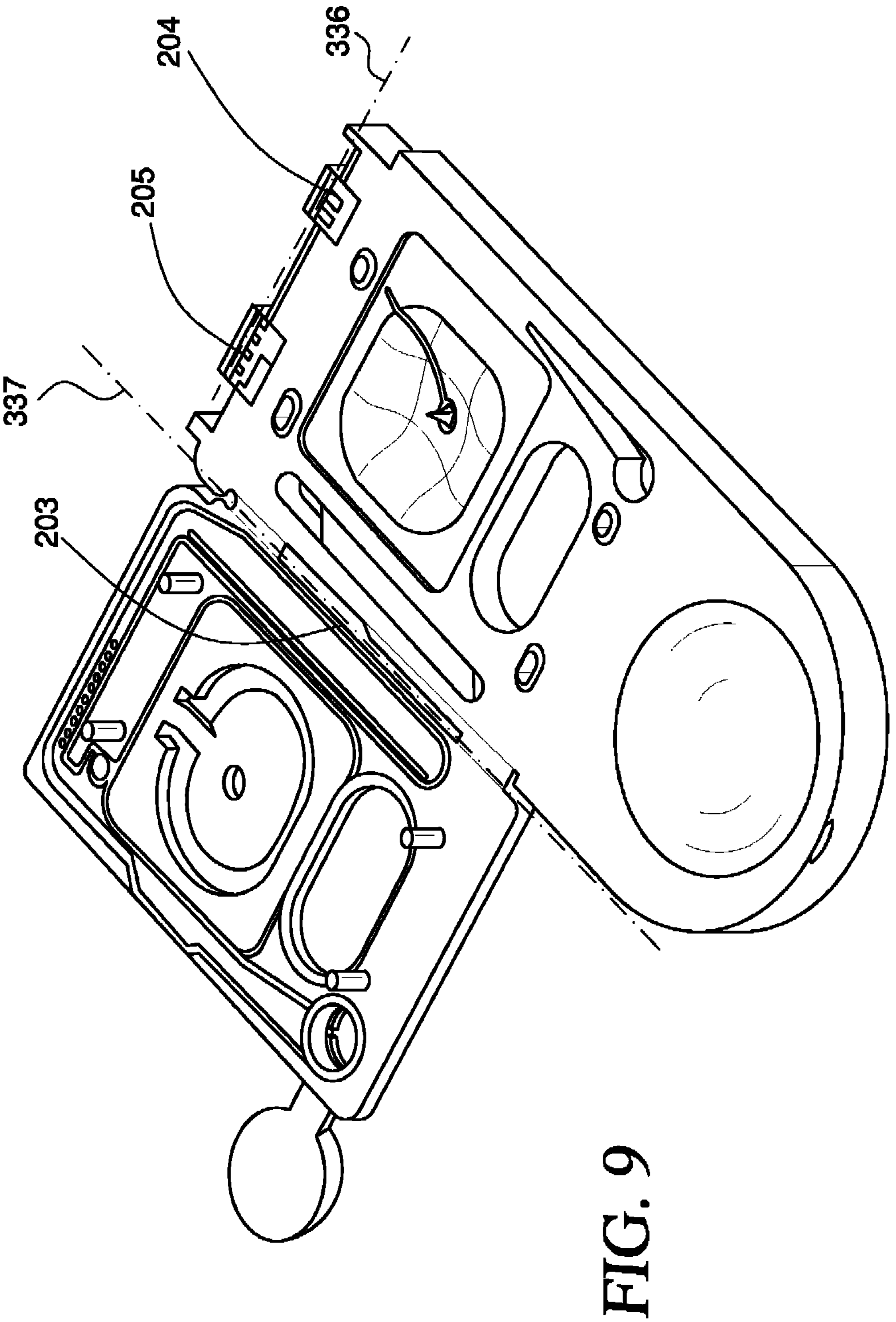
FIG. 9 is an alternative embodiment whereby the cartridge foldable about a hinge disposed on one of its longitudinal sides.

Referring to FIG. 3A and FIG. 10A, it can be seen that the hinge region 203 comprises portions of the substantially rigid zone and substantially flexible zone of the housing. See 203A and 203B, respectively. This combined material approach has the benefit of conferring a degree of rigidity and flexibility to the hinge region 203. The value of such a combination assures the hinge easily bends through roughly 180 degrees without adding undesired stresses to other functional elements of the housing. Preferably, the substantially rigid zone in the hinge region is sufficiently thin such that the substantially rigid material does not snap or otherwise fail when the two opposing halves are rotated about the hinge region. As can be seen from FIG. 3A and FIG. 10A, the housing on either side of the hinge region comprises two complimentary halves of a cartridge which can fold together to abut and attach the two complimentary interior surfaces of the two halves. Note that when in a closed position, the hinge region 203 is preferably opposite sensor recess 204. In addition, hinge region 203 preferably has a hinge region axis 235 and sensor recess 204 has a sensor recess axis 236. The hinge region axis 235 preferably is substantially parallel to the sensor recess axis 236, as shown in FIGS. 3A and 10A. In this context, the term "axis" refers to an imaginary line passing through the major longitudinal orientation of the component. In another embodiment, shown in FIG. 9, hinge region axis 337 is oriented substantially orthogonally to the sensor recess axis 336 of the sensor recess 204. Of course, other orientations of these axes are also possible. The selection primarily will depend on other manufacturing issues, e.g., filling of the mold and insertion of the sensors.

To attach together the interior surfaces of the two halves, the housing preferably includes one or more mating elements 209A (male) 209B (female) on either or both sides of the hinge region, whereby folding of the two halves engages the mating elements in a secure manner. Alternatively, symmetrically matched parts may be used. Preferably, the mating of the mating elements causes the opposing halves of one or more conduits of the cartridge, e.g., conduit 207, to be fluidically sealed such that fluid passing through the one or more conduits will be constrained and flow along the path of the conduit. In a preferred embodiment, the cartridge comprises a primary conduit beginning at a sample entry orifice and including a sample holding chamber between the sample entry orifice and a capillary stop for forming a metered sample. The conduit also includes a sensing region comprising one or more sensors and in which the sample is analyzed. The conduit optionally further comprises a waste chamber.

Figure 6A:
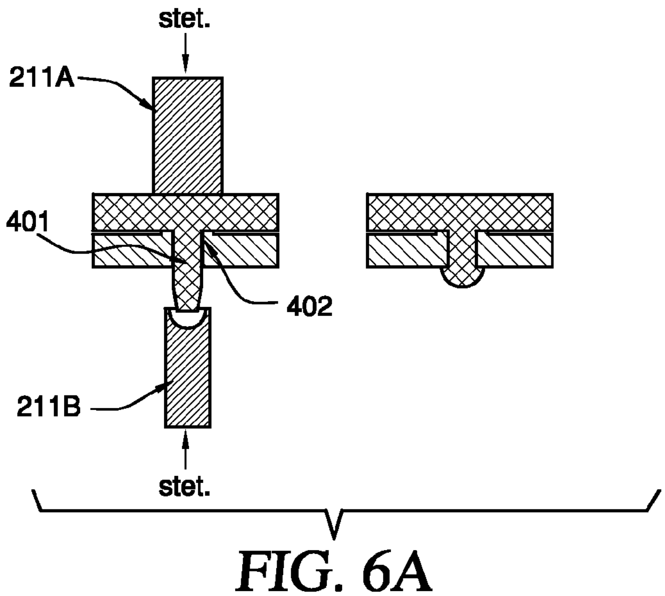
FIGS. 6A-6C illustrate three optional closure mechanisms that may be employed to seal the cartridge in a closed position after it is folded about the hinge region.

The form in which the mating elements may be joined together may vary widely. In a preferred embodiment, shown in FIG. 6A, each mating element comprises a prong 401 and a corresponding alignment hole 402. Each alignment hole 402 preferably is aligned with a prong 401 such that the prong is inserted into the hole upon closure of the cartridge housing, i.e., upon folding of the two halves about hinge region 203. Depending on the desired design, each prong/alignment hole pair may fit loosely (for example if the prong will be subsequently secured as a rivet) or may be interference fit. The prongs may be on either side, e.g., top or bottom portions, of the device. Once the prong 401 from one side of the cartridge housing is inserted into the corresponding alignment hole 402 in the opposite side of the cartridge housing, the mating elements may be joined together using an anvil 211A and riveting pin 211B. The riveting pin 211B preferably comprises a concave head, as shown in FIG. 6A, and is capable of deforming the prong 401 to form a rivet and securing the two halves to one another. The riveting pin 211B may be heated, for example, to at least the deflection temperature of the composition that forms the prong 401. In a preferred aspect, an automated folding machine is used to act as the anvil 211A to apply a force that is transferred to a heated riveting pin 211B. This softens and deforms the end of the prong 401 to form a rivet having a curved outer profile, as shown.

Alternatively, the riveting pin 211A may comprise a machined cold-staking element, which deforms the mating element 209A under pressure, but without heating (or with minimal heating resulting from the application of pressure). The cold staking process is substantially the same as that for hot-staking in 211, with the omission of heating. In this aspect, either the anvil 211A or the riveting pin 211B optionally is stationary during the riveting process.

The staking process preferably compresses the substantially flexible material, e.g., elastomer, uniformly across the cartridge body providing an even seal throughout and forming one or more liquid tight conduits. To achieve this, the staking pegs ideally are spaced to achieve a substantially uniform tension in the seal area. To accommodate the required fluid conduit geometry, finite element analysis may be used to determine the number of staking pegs and their positions. This analysis predicts the distortion of the rigid polymer caused by the compression of the substantially flexible material. The distortion of the substantially rigid material should be less than the intended compression of the substantially flexible material to ensure formation of a proper seal. The height and section of the substantially flexible material can be changed locally to compensate for substantially rigid material distortion in order to maintain a desired seal. The compression of the substantially flexible material in a cartridge preferably is from 0.0005 to 0.050 inches (12 μm to 1270 μm), e.g., from about 0.001 to 0.010 inches (25 to 254 μm), or preferably about 0.005 inches (about 127 μm). Hardstops may be included in the design of the staking pegs and bosses to ensure compression is no greater than the desired amount, e.g., about 0.005 inches (127 μm).

In another aspect, the mating elements may be joined by ultrasonic welding. For example, the housing may comprise one or more welding regions on either or both sides of the hinge region, whereby folding engages complimentary welding regions. That is, folding engages said welding regions so that they are configured such that they may be welded together in a secure manner to form said conduit. The engaged complimentary welding regions then may be welded to one another in a welding step to secure them together. Each riveting pin 211B, for example, may comprise an ultrasonic horn. In this aspect, the anvil 211A preferably aligns with the ultrasonic horn 211B (riveting pin), with the folded cartridge in between and positioned adjacent to prong 401 and hole 402. Application of ultrasonic energy by the ultrasonic horn causes the corresponding prong to deform, thereby forming a rivet to secure the two halves together.

Figure 6B:
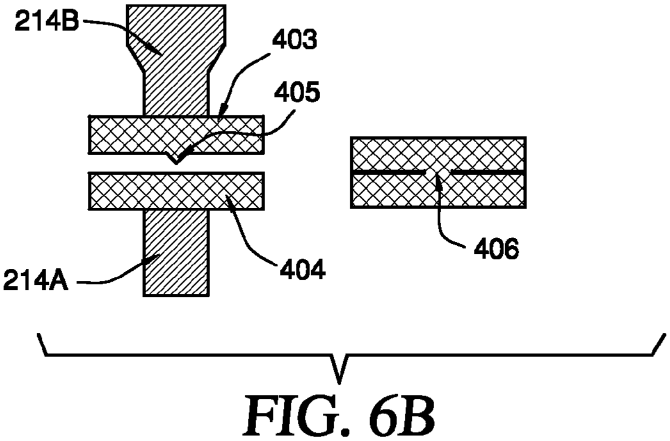

In another embodiment, shown in FIG. 6B, the horn and anvil align a first piece of the housing 403 and a second piece of the housing 404 when in the folded position. Between the two pieces of housing is a joining bond 405, which, as shown, is a small area of plastic standing proud of the first piece of the housing 403. Application of ultrasonic energy provides a weld 406, as shown. In various optional embodiments, the welding may comprise ultrasonic, laser or thermal welding.

Figure 6C:
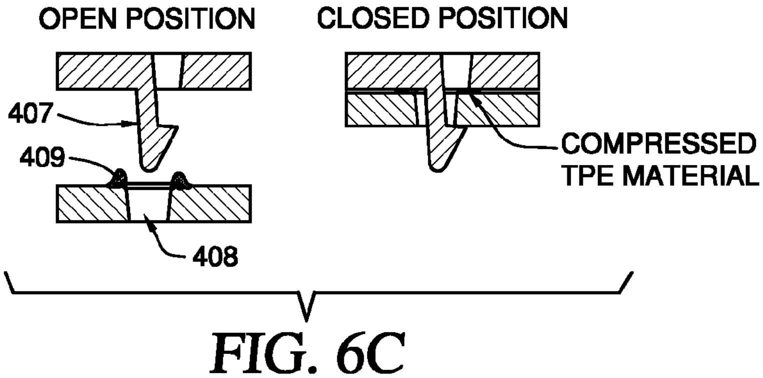

FIG. 6C illustrates a snap closure where one side (top or bottom) of the housing includes one or more hooks 407 which align and penetrate a corresponding hook hole 408 on the other side (bottom or top) of the housing during folding and are thereby secured to one another, as shown in going from the open to the closed position. Optionally, TPE material 409 may surround the inner surface of the hook hole 408, as shown, in order to provide an additional sealing function. Additionally or alternatively, an elastomeric TPE material may surround the one or more hooks 407.

In another embodiment, the housing comprises one or more gluable mating elements on either side of the hinge region. Folding engages the mating elements in a secure manner after glue is applied to one or both halves of the mating element. As described above, this embodiment forms the cartridge having the desired conduit network.

Reverting to FIG. 3A, in a preferred embodiment, the cartridge further comprises a sealed pouch 215A containing a fluid (not shown in FIG. 10A). Generally, the composition of the fluid in the pouch 215A may be selected from the group consisting of water, calibrant fluid, reagent fluid, control fluid, wash fluid and combinations thereof. As shown, pouch 215A is disposed in a recessed region 215B and in fluid communication with a conduit 210 leading to the sensor region 204, optionally via conduit 207. The pouch may be of the design described in U.S. Pat. No. 5,096,669 or, more preferably, in U.S. patent application Ser. No. 12/211,095, both of which are incorporated herein by reference in their entireties. Recessed region 215B preferably includes a spike 205 configured to rupture the pouch 215A, upon application of a force upon the pouch, for example, by reader or instrument 102 (FIG. 2). Once the pouch is ruptured, the system is configured to deliver the fluid contents from the pouch into conduit 210. Movement of the fluid into the conduit 210 and to sensor region 204 and/or within conduit 207 may be effected by a pump, e.g., a pneumatic pump connected to the conduit 207. Preferably, the pneumatic pump comprises a displaceable membrane formed by a portion of the substantially flexible zone 216 of the housing. In the embodiment shown in FIG. 3A and FIG. 10A, upon repeatedly depressing substantially flexible zone 216, the device pumps via conduits 230 and 207 causing fluid from ruptured pouch 215A to flow through conduit 210, into conduit 207 and over sensor region 204.

The cartridge may include one or more features on the top and/or bottom of the cartridge to prevent slippage while being filled by the user. These features could be made of the substantially rigid material or the substantially flexible material;

alternatively, they could be formed of both materials. These features could for example include ribs, studs or a textured surface. The features could be concentrated locally on the underside (e.g. beneath the thumb grip) or could be spaced across the whole underside. As shown in FIG. 4, in a preferred embodiment, a portion of the substantially flexible zone forms an ergonomic thumb well 223. The thumb well assists the user in handling the device, e.g., holding the device during the sample filling step and in engaging the cartridge with the reading instrument.

As shown in FIG. 3A and FIG. 10A, in a preferred embodiment, the cartridge comprises a sealable sample entry port 224, closable sealing member 225 for closing the sample entry port, a sample holding chamber 226, a sensing region 227, and a waste chamber 228. Preferably, the cross-sectional area of a portion of the sample holding chamber 226 decreases distally with respect to the sample entry port 224, as shown by ramp 229 in FIG. 9.

With regard to the sealable sample entry port 224, a portion of the substantially rigid zone forms a sealing member 225, and a portion of the substantially flexible zone forms a perimeter seal 231, whereby the sealing member can rotate about hinge 335 and engage the perimeter seal when in a closed position, thus providing an air-tight seal. Alternatively, the perimeter seal may be formed by contact of two flexible materials, e.g., TPE on TPE. Optionally, the sealable sample entry port also includes a vent hole 232, shown in FIG. 3B and FIG. 10B. In another embodiment, the sealing member may include a slidable closure element as described in pending US 20050054078, the entirety of which is incorporated herein by reference.

Other features of the cartridge, shown in FIG. 3B and FIG. 10B, include a portion of the substantially flexible zone 233 positioned over the pouch area. As shown, region 233 may include generic symbol description to indicate to the user that pressure should not be applied by the individual. As shown, the symbol comprises an embossed circle with a crossbar for providing a surface that can accommodate an actuator feature of instrument 102 (FIG. 2) to apply a force and burst the underlying pouch 215A. The thickness of the plastic in the substantially flexible zone 233 is most preferably about 400 μm and preferably from about 200 to about 800 μm. Essentially, region 233 should be sufficiently thin to flex easily, but sufficiently thick to maintain physical integrity and not tear.

Figure 8:
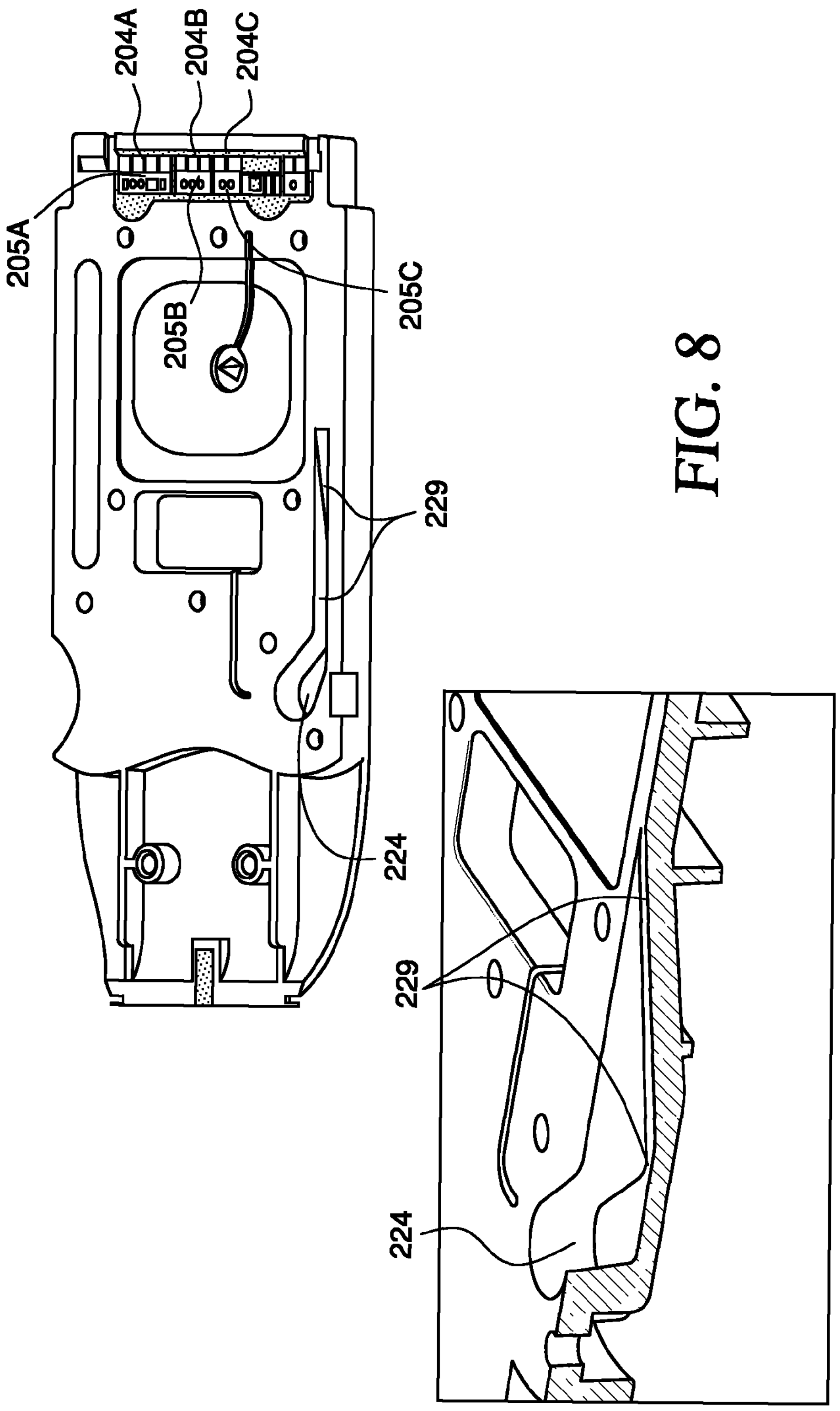
FIG. 8 is a magnified perspective view of the sample entry orifice and holding chamber region of a cartridge according to one embodiment of the invention.

With regard to the sensor or sensors used in the cartridge, the sensor recess 204 preferably contains a sensor array generally comprised of a plurality of sensors for a plurality of different analytes (or blood tests). Thus the cartridge may have a plurality of sensor recesses each with at least one sensor. FIG. 8, for example, shows three sensor recesses 204A, 204B and 204C, containing three sensor chips, 205A, 205B and 205C respectively. In the embodiment shown, the first chip has four sensors, the second three sensors and the third two sensors; thus, the sensor array comprises nine different sensors.

The analytes/properties to which the sensors respond generally may be selected from among pH, $pCO_2$, $pO_2$, glucose, lactate, creatinine, urea, sodium, potassium, chloride, calcium, magnesium, phosphate, hematocrit, PT, APTT, ACT (c), ACT(k), D-dimer, PSA, CKMB, BNP, TnI and the like and combinations thereof. Preferably, the analyte is tested in a liquid sample that is whole blood, however other samples can be used including blood, serum, plasma, urine, cerebrospinal fluid, saliva and amended forms thereof. Amendments can include dilution, concentration, addition of regents such as anticoagulants and the like. Whatever the sample type, it can be accommodated by the sample entry port of the device.

As the different tests may be presented to the user as different combinations in various cartridge types, it may be desirable to provide an external indication of these tests. For example, the three tests pH, $pCO_2$ and $pO_2$ may be combined in a single cartridge. These tests are used by physicians to determine blood gas composition and this type of cartridge is generally designated as G3+. For ease of recognition by the user this designation may optionally be embossed (during or after molding) into the substantially rigid or flexible region of the cartridge, for example on the plastic in the thumb well 223 area. The optional product identification label may or may not be engraved or embossed. For example, in other embodiments, a sticker may be applied to the cartridge to provide the desired identification. In other aspects, thermal transfer printing, pad printing, or ink jet printing are employed for this purpose. Clearly other designations or symbols may optionally be used for other test combinations and located at different places on the exterior of the cartridge. Note also that different colors of the flexible plastic portion may be used, e.g., red for a G3+ and another color for another type. Alternatively, color may be used in a different way for cartridges that require the blood sample to have a specific anticoagulant added to the sample when the sample is drawn, for example, into a Vacutainer™ device. These commonly used blood collection devices use different colored plastic tops to indicate the type of anticoagulant. For example, green-tops code for lithium heparin and purple-tops code for potassium EDTA. Thus, a BNP test that requires sample collected in a purple-topped tube may also be a cartridge with a purple flexible molded portion. Likewise a green combination would be appropriate for a TnI test. Such combinations make user errors associated with sample collection with an inappropriate anticoagulant less likely.

Note that the cartridges may be managed by an inventory control system at the point of care, for example, by the processes described in U.S. Pat. No. 7,263,501 which is jointly owned and incorporated herein by reference in its entirety.

Generally, the cartridge of the present invention comprises a single-use disposable device that is used in conjunction with a portable instrument that reads the sensor signals. Preferably the sensors are microfabricated, or at least manufactured in a high-volume reproducible manner. The fundamental operating principles of the sensor can include, for example, electrochemical, amperometric, conductimetric, potentiometric, optical, absorbance, fluorescence, luminescence, piezoelectric, surface acoustic wave and surface plasmon resonance.

In addition to the conception of a device, the present invention also includes a method of making a test cartridge for measuring an analyte in a liquid sample. This involves molding a housing comprising a first substantially rigid zone and a second substantially flexible zone, and which includes a hinge region separating opposing surfaces, which when folded about the hinge region, form one or more conduits. During the two-shot molding process, the flexible or rigid material forms at least one sensor recess. Once the molded housing is removed from the mold a sensor is inserted into the recess, along with other optional elements, e.g., a calibrant pouch and optional gasket, as described above. This is followed by folding the housing at the hinge region to oppose and seal the housing together. This sealing process forms a cartridge with a conduit over at least a portion of the sensor, thus enabling a fluid sample, e.g., blood, or other fluid, e.g., calibrant or wash fluid, to be moved through the one or more conduits and into contact with the sensor.

Furthermore, the completed cartridge can also include a feature whereby the act of closing or opening the sample entry port by the user stores or provides energy for subsequent actuations. For example, the act of closing or opening the sample entry port may force the sample or calibrant fluid into a desired position in one or more of the conduits.

Substantially Rigid and Substantially Flexible Zones

A preferred embodiment of the invention is illustrated in FIG. 3 (in unfolded open form). The test cartridge, which preferably is capable of measuring an analyte (or property of the sample) in a liquid sample, comprises a molded housing 200 with a first substantially rigid zone 201 formed of a substantially rigid material and a second substantially flexible zone 202 formed of a substantially flexible material.

As used herein, the terms "substantially rigid" and "substantially flexible" are relative with respect to one another such that the substantially rigid zone or material is harder and exhibits less elasticity relative to the substantially flexible zone or material. In some exemplary embodiments, the substantially rigid zone or material has an absolute hardness value that is at least 25% greater than, e.g., at least 50% greater than, or at least 100% greater than, the hardness of the substantially flexible zone or material. As used herein, "hardness" refers to indentation hardness, whether determined by a Shore A/D Durometer, by a Rockwell hardness tester or other indentation hardness detector. In terms of elasticity, the substantially rigid zone or material preferably has a Young's modulus that is at least 10 times greater than, at least 100 times greater than or at least 1000 times greater than that of the substantially flexible zone or material.

The substantially rigid zone is formed of a substantially rigid material and preferably is molded from an injection moldable plastic. The substantially rigid zone, for example, may be molded from PET, more preferably from a PET copolymer capable of being injection molded, such as PETG (Eastman Chemical or SK Chemicals). Alternatively, the substantially rigid zones may be formed of ABS (acrylonitrile butadiene styrene), polycarbonate (either poly aromatic or poly aliphatic carbonate, and preferably bisphenol A derived polycarbonate) or mixtures thereof. Likewise polystyrene, Topaz, acrylic polymers such as polymethylmethacrylate (PMMA) can also be used.

Although the specific properties of the substantially rigid material may vary, in preferred embodiments the substantially rigid material has a Shore D hardness of at least 50 Shore D, e.g., at least 80 Shore D, or at least 90 Shore D. In terms of Rockwell R hardness, the substantially rigid material preferably has a hardness of at least 50, at least 80 or at least 100, e.g., from about 50 to 130, from 90 to 120 or from 100 to 110. The substantially rigid material preferably has a specific gravity of greater than about 1.0, e.g., from 1.0 to 1.5, or from 1.2 to 1.3. As indicated above, the substantially rigid material preferably is substantially non-elastic, particularly when compared to the substantially flexible material. The substantially rigid material optionally has a Young's modulus of at least 2000 MPa, e.g., at least 2500 MPa or at least 2800 MPa. In terms of ranges, the substantially rigid material optionally has a Young's modulus of from 1500 to 3500 MPa, e.g., from 2000 to 3300 MPa, or from 2800 to 3100 MPa.

The substantially flexible zone is formed of a substantially flexible material and preferably is molded from an injection moldable thermoplastic elastomer, examples of which include various rubbers, Mediprene™, Thermolast K™, and mixtures thereof. Mediprene™ (e.g., Mediprene™ A2 500450M) is an injection-moldable VTC thermoplastic elastomer (TPE) formed from Styrene-Ethylene-Butylene-Styrene (SEBS) rubber, paraffinic oil and polypropylene. Additional substantially flexible materials that optionally are used in the present invention include one or more of nitrile-butadiene (NBR), hydrogenated NBR, chloroprene, ethylene propylene rubber, fluorosilicone, perfluoroelastomer, silicone, fluorocarbon, or polyacrylate. If the substantially flexible material is a rubber, the rubber preferably is selected from a series of rubbers having passed USP Class VI, the paraffinic oil is a medicinal white oil preferably, complying with the European Pharmacopoeia for light liquid paraffin, and the polypropylene is a medical grade that has passed USP Class VI. Thermolast K™ TPEs also are injection moldable and are based on hydrated styrene block copolymers. Thermolast K TPEs also are USP Class VI certified and may be used, for example, in combination with many materials such as ABS and PC.

Although the specific properties of the substantially flexible material may vary, in exemplary embodiments the substantially flexible material has a Shore A hardness ranging from 30 to 90 Shore A, e.g., from to 40 to 60 Shore A or from 40 to 50 Shore A, as determined by ASTM D2240 (4 mm), the entirety of which is incorporated herein by reference. The substantially flexible material preferably has a modulus of elasticity at 100% strain as determined by ASTM D638, the entirety of which is incorporated herein by reference, of from 0.1 to 6 MPa, e.g., from 0.5 to 3 MPa or from 1 to 2 MPa, and at 300% strain of from 0.2 to 8 MPa, e.g., from 1 to 5 MPa or from 1 to 3 MPa. The substantially flexible material preferably has a specific gravity as determined by ASTM D792, the entirety of which is incorporated herein by reference, of from about 0.7 to 1.2, e.g., from 0.8 to 1.2 or from 0.9 to 1.1.

Ideally, the material used to form the substantially flexible zone exhibits good adhesion to the substantially rigid material. The two materials preferably exhibit a peel force at 50 mm of at least 4 N/mm, e.g., at least 6 N/mm or at least 8 N/mm, as determined according to the Renault D41 1916 standard, the entirety of which is incorporated herein by reference. In terms of ranges, the materials preferably exhibit a peel force at 50 mm of from 4 N/mm to 20 N/mm, e.g., from 6 N/mm to 10 N/mm or from 8 to 10 N/mm. In the Renault D41 1916 standard, a 130×20×2 mm substantially flexible material sample is adhered to a 130×22×2 mm substantially rigid material sample. A tensile testing machine is secured to a clamp on a short (20 mm) edge of the substantially flexible material, which is then peeled away from the underlying substantially rigid material, which is secured to a flexible clamp. Increasing force is applied on the tensile testing machine until the substantially flexible material has been peeled away from substantially rigid material by 50 mm.

Capillary Stop

Figure 7:
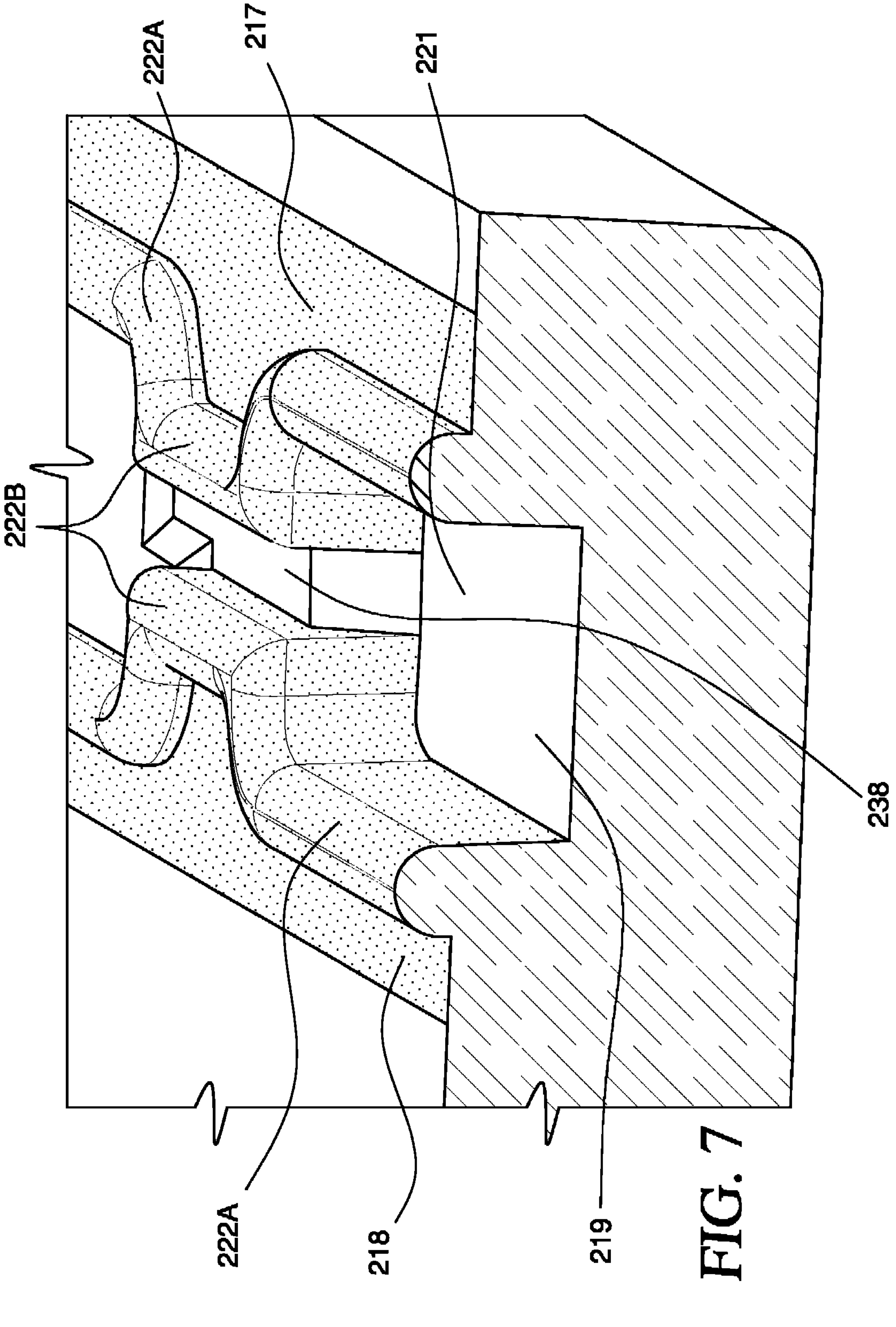
FIG. 7 is a magnified perspective view of a capillary stop region according to one aspect of the invention.

FIG. 7 shows a magnified view of the capillary stop region, as referenced by cross-hatched region 234 in FIG. 3A, according to a preferred embodiment of the invention. Portions of the substantially flexible zone 217 and 218 form two of the walls of conduit 207. In addition, a portion of the substantially rigid zone 219 forms at least one of the walls of the conduit 207. In a preferred embodiment, when in the closed and sealed position, substantially flexible zones 217 and 218 form a gasket, which essentially determines and defines the position of conduit 221. With respect to FIG. 8, the complimentary portion on the other half of the housing (not shown) is folded over to contact the exposed surface of the substantially flexible zones 217 and 218, thus enclosing the space below to form the conduit. In this respect, the gasket defines the geometry and dimensions of the conduit. Note that the cross-sectional area may change along the conduit but is generally in the range of from about 0.1 to about 10 $mm^2$, and typically about 1 mm×2 mm in the region of the conduit 207 above the sensor region 207. Note also that the gasket further comprises a compliant sealing ridge 222A which assists in preventing leakage of fluid out of the conduit during operation, i.e., assuring the conduit is liquid-tight. Note that the portion of 222A that narrows in on either side (see ridges 222B in FIG. 7) forms a capillary stop, i.e., a point in the conduit where sample, e.g., blood sample, stops when the cartridge is inoculated with a blood sample. The well defined stop also enables subsequent metering of a defined sample volume. Furthermore, an elevated rigid portion 238 stands slightly proud of adjacent rigid portions. This also acts to narrow the cross-sectional area of the capillary stop. To move the blood beyond the capillary stop requires displacement of air from air bladder 216 (FIG. 3A and FIG. 10A), which is actuated by the instrument 102 (FIG. 2). This combination of features ensures the sample is kept separate from any calibrant fluid during the analysis cycle.

Cartridge Manufacture

Two-shot injection molding has been used in the past to manufacture plastic objects such as pens, toothbrushes and automotive parts. Notably, the technique has been applied to computer keyboards (see U.S. Pat. No. 4,460,534) and other components, e.g., U.S. Pat. No. 6,296,796 and U.S. Pat. No. 4,444,711. The latter addresses molding a part with rubber and non-rubber portions. While U.S. Pat. No. 7,213,720 discloses a two-shot molding process using two different plastics where a device is formed by folding at a hinge portion, the concept has only been applied to devices for packaging of moisture sensitive items. See also related U.S. Pat. No. 7,537,137 and pending WO 2008030920. US 20080110894 describes a two-shot molded device with a hinge that acts as a vial for a stack of sensor strips and WO 2007072009 is similar but addresses a container with an RFID tag. Finally, U.S. Pat. No. 5,597,532 describes a folded test strip with a blood separation layer that excludes red cells, for example where the separation layer is treated with metal salts.

A preferred embodiment for manufacturing a cartridge according to the invention involves two-shot molding of a cartridge housing. In a first step, the substantially rigid portion of the housing is injection molded into a first mold cavity using a substantially rigid material such as polyethylene terephthalate glycol (PETG). This part is then removed, preferably automatically, from the first mold cavity and inserted into a second mold cavity with voids corresponding to the desired location of the substantially flexible material. Once sealed, a substantially flexible material, e.g., thermoplastic Mediprene™, may be injection molded to form the complete housing. As would be appreciated by those skilled in the art, the materials that are injection molded, e.g., the substantially rigid material and the substantially flexible material, preferably are substantially free of moisture in order to avoid cracking. In a preferred embodiment, cycle time for the first and second injection and release steps is on the order of about five seconds for both steps. The actual mold design of the first and second shots may correspond, for example, to the parts as shown in various renditions of FIG. 3A and FIG. 10A. Preferred mold dimensions are also inferred from the geometries described above for FIG. 3A and FIG. 10A.

A preferred molding process is referred to in the art as lift and turn, rotary, core back sequencing or over molding. In a preferred embodiment, a lift and turn type mold contains two separate cavities. The first set forms the substantially rigid zone on the first shot before it is removed, rotated and inserted into a second cavity which forms the substantially flexible zone with the second shot. Each cavity includes one or more plastic injection gates. Molding is completed in a press of the appropriate tonnage for the clamping force and mold size. Molding presses of this general type are manufactured by Nestal, Engles, Roboshot among others.

The present invention is not limited to two-shot molding. For example, a three-shot mold allowing three different materials to be molded into a single part may be employed. Specifically, two separate areas of the flexible region can be formed, e.g., in different colors to aid in usability. Alternatively, the third shot can mold a desiccant plastic material into the housing. As several sensors are sensitive to moisture, the inclusion of a desiccant directly into the cartridge may be desired. While it is clear that multiple cavities can be used, both cost and manufacturing simplicity dictate that the fewest separate molding steps are used where possible.

In a preferred automated process, the cartridge assembly system orients incoming unpopulated cartridge housings for placement onto an automated main mover, which traverses the housing through the assembly process. At a first position, sensor chips may be picked from chip waffle trays or wafer film frames, oriented and placed into the chip wells within the cartridge housing. At a second position, inspection for damage may be completed by an intelligent automatic vision system before moving the housing. In the next step, the cartridge housing may be moved to the calibration pack station which takes a calibration pack from a bulk feeder and inserts it into the cartridge housing. At the next station, the housing may be automatically folded over at the hinge region and the alignment pins may be hot or cold-staked to deform them into position such that the two halves of the housing are locked together and thus form conduits therebetween. Other securing means may be employed as described above with reference to FIGS. 6A-6C. In the final step, the completed cartridges preferably are inspected before being placed on a continuous feed belt conveyer for delivery to an automated packaging unit.

In a preferred embodiment, the main mover transfers multiple parts through the line at the same time with each station operating independently but in concert. The entire system preferably operates at a rate to provide about one completed cartridge about every 0.5 to 3.0 seconds. The main mover, for example, may be a conveyer, linear motor, indexing conveyer, with open or closed loop control, or similar device.

The sensor chips preferably are picked and placed into position within the housing with either an articulated robotic arm or a precision X, Y and Z gantry. Alternatively, positioning of the chips into the chip wells may be vision assisted or performed by a blind automated placement. Due to the compression fit of the chip into the chip well, that is, the slight deformation of the substantially flexible portion of the plastic housing that receives the chip, the placement mechanism preferably includes a spreading apparatus to deform the substantially flexible material before inserting the chip. After this step, a line-scan or area-scan inline camera may inspect the chip for irregularities or damage caused by the automated insertion. If a defect is detected, the offending housing is automatically removed from the assembly line and designated as either reworkable material or scrap.

Regarding the sealed pouch (calibration pack) insertion module, the bulk feeding and orientation of the sealed pouches are preferably by means of a vibratory type system, but alternatively may be based on a centrifugal, ladder or waterfall type system. When the sealed pouch is placed in the sealed pouch recessed region within the base, it may also be staked or pinned in place to prevent movement.

As described above, one advantage of the present invention over the prior art is the incorporation of top and bottom housing portions into a single component, preferably without an intervening adhesive tape. This eliminates the combinational variability of using multiple covers with multiple bases and the alignment issues that arise during manufacturing.

In the present invention, integrally molded alignment prongs improve cover to base alignment while also providing the clamping force necessary to seal the base by methods such as cold-staking, heat-staking, swaging, ultrasonic welding or laser welding. These alignment prongs can also be modified to incorporate a self aligning snap together fitting, as described above. In the preferred manufacturing process, the cover half of the cartridge is folded over engaging the alignment prongs with their respective alignment holes, and cold-staking deforms the end of the alignment prongs effectively clamping the cover half and base half together. Optionally, but less preferred, is the use of an adhesive or formable resin, e.g., epoxy.

After the staking process, the cartridge may be packaged in a moisture resilient container, preferably a pouch formed of a thermoformable material such as PETG, Polystyrene or a plastic laminate with a foil layer. The primary package may then be fed into a secondary packaging unit for boxing and overpacking.

The invention described and disclosed herein has numerous benefits and advantages compared to previous devices. These benefits and advantages include, but are not limited to ease of use and the automation of most if not all steps of manufacture. While the invention has been described in terms of various preferred embodiments, those skilled in the art will recognize that various modifications, substitutions, omissions and changes can be made without departing from the spirit of the present invention. Accordingly, it is intended that the scope of the present invention be limited solely by the scope of the following claims.

We claim:

1. A cartridge housing for forming a cartridge capable of measuring an analyte or property of a liquid sample, the housing comprising: a first substantially rigid zone, a second substantially flexible zone, a hinge region, and at least one sensor recess containing a sensor, wherein said housing is foldable about said hinge region to form a cartridge having a conduit over at least a portion of said sensor; wherein the cartridge has an unfolded position comprising a top portion and a bottom portion separated by the hinge region; and wherein the top portion forms a top portion of the conduit and the bottom portion forms a bottom portion of the conduit, and wherein the conduit is formed upon folding of the housing about the hinge region.

2. The cartridge housing of claim 1, wherein the substantially rigid zone or the substantially flexible zone is a single contiguous zone.

3. The cartridge housing of claim 1, wherein the substantially rigid zone or the substantially flexible zone comprises a plurality of non-contiguous zones.

4. The cartridge housing of claim 1, wherein the at least one sensor recess is in a portion of said substantially flexible zone.

5. The cartridge housing of claim 1, wherein the at least one sensor recess is in a portion of said substantially flexible zone forming a liquid-tight seal around a perimeter of the sensor.

6. The cartridge housing of claim 1, wherein the at least one sensor recess is in a portion of said substantially rigid zone.

7. The cartridge housing of claim 1, wherein the at least one sensor recess is in a portion of said substantially rigid zone, and said sensor is secured to the sensor recess by a liquid-tight seal formed by an adhesive tape.

8. The cartridge housing of claim 1, wherein the at least one sensor recess is in a portion of said substantially rigid zone, said sensor is secured by a liquid-tight seal, and wherein said seal is formed by at least one of glue, a perimeter of formable resin or a dielectric grease.

9. The cartridge housing of claim 1, wherein said substantially rigid zone comprises PETG.

10. The cartridge housing of claim 1, wherein the substantially rigid zone comprises a material selected from the group consisting of ABS, polycarbonate, polystyrene, Topaz, acrylic polymers, PMMA and combinations thereof.

11. The cartridge housing of claim 1, wherein the substantially flexible zone comprises a thermoplastic elastomer.

12. The cartridge housing of claim 1, wherein the substantially flexible zone is molded from an injection moldable thermoplastic elastomer having modulus of elasticity at 100% strain as determined by ASTM D638 of from 0.1 to 6 MPa.

13. The cartridge housing of claim 1, wherein the hinge region comprises portions of the substantially rigid zone and of the substantially flexible zone.

14. The cartridge housing of claim 1, wherein the hinge region has a hinge region axis and the at least one sensor recess has a sensor recess axis, and wherein the hinge region axis is substantially parallel to the sensor recess axis.

15. The cartridge housing of claim 1, wherein the hinge region has a hinge region axis and the at least one sensor recess has a sensor recess axis, and wherein the hinge region axis is substantially orthogonal to the sensor recess axis.

16. The cartridge housing of claim 1, wherein said housing comprises one or more mating elements on either or both sides of said hinge region, and wherein folding engages the one or more mating elements in a secure manner to form said conduit.

17. The cartridge housing of claim 16, wherein opposing mating elements are matable by hot staking, cold staking or by a snap closure.

18. The cartridge housing of claim 16, wherein the one or more mating elements are secured with glue to form said conduit.

19. The cartridge housing of claim 1, wherein said housing comprises one or more welding regions on either or both sides of said hinge region, and wherein folding engages the one or more welding regions so that they are configured such that they may be welded together in a secure manner to form said conduit.

20. The cartridge housing of claim 19, wherein said welding is selected from the group consisting of ultrasonic welding, laser welding and thermal welding.

21. The cartridge housing of claim 1, further comprising a pouch containing a fluid, wherein said pouch is in fluid communication with said conduit.

22. The cartridge housing of claim 1, further comprising a pneumatic pump connected to said conduit.

23. The cartridge housing of claim 22, wherein said pump comprises a displaceable membrane formed by a portion of said substantially flexible zone of said housing.

24. The cartridge housing of claim 1, wherein a portion of said substantially flexible zone forms at least two of the walls of said conduit.

25. The cartridge housing of claim 1, wherein a portion of said substantially rigid zone forms at least one of the walls of said conduit.

26. The cartridge housing of claim 1, wherein a portion of said substantially flexible zone forms a gasket defining the position of said conduit.

27. The cartridge housing of claim 1, wherein a portion of said substantially flexible zone forms a gasket defining the geometry and dimensions of said conduit.

28. The cartridge housing of claim 1, wherein a portion of said substantially flexible zone forms a gasket defining the position of said conduit, and wherein said gasket further comprises a compliant sealing ridge.

29. The cartridge housing of claim 1, wherein a portion of said substantially flexible zone forms an ergonomic thumb well.

30. The cartridge housing of claim 1, wherein said conduit is liquid-tight.

31. The cartridge housing of claim 1, wherein said conduit further comprises a sealable sample entry port, a sample holding chamber, a sensing region and a waste chamber.

32. The cartridge housing of claim 1, wherein said conduit further comprises a sealable sample entry port and a sample holding chamber, wherein the cross-sectional area of a portion of the sample holding chamber decreases distally with respect to the sample entry port.

33. The cartridge housing of claim 1, wherein said conduit further comprises a sealable sample entry port wherein a portion of said substantially rigid zone forms a sealing member and a portion of said substantially flexible zone forms a perimeter seal around said sample entry port, wherein said sealing member is engageable with said perimeter seal.

34. The cartridge housing of claim 1, wherein said conduit further comprises a sealable sample entry port and a vent hole.

35. The cartridge housing of claim 1, wherein the at least one sensor recess contains a sensor array comprising a plurality of sensors for a plurality of analytes.

36. The cartridge housing of claim 1, wherein the at least one sensor recess comprises a plurality of recesses each of which contains at least one sensor.

37. The cartridge housing of claim 1, wherein the cartridge is a single-use disposable cartridge.

38. The cartridge housing of claim 1, wherein the cartridge is a multiple-use cartridge.

39. The cartridge housing of claim 1, wherein said sensor is selected from the group consisting of electrochemical, amperometric, conductimetric, potentiometric, optical, absorbance, fluorescence, luminescence, piezoelectric, surface acoustic wave and surface plasmon resonance sensors.

40. The cartridge housing of claim 1, wherein the cartridge housing is in an open position.

41. The cartridge, comprising the cartridge housing of claim 1, in a closed position.

42. A method of making a test cartridge for measuring an analyte or property of a liquid sample, the method comprising the steps of:

(a) molding a housing comprising a first substantially rigid zone and a second substantially flexible zone, wherein said housing has a top portion and a bottom portion separate by a hinge region wherein the top portion forms a top portion of a conduit and the bottom portion forms a bottom portion of the conduit, and wherein said substantially flexible zone has at least one sensor recess;

(b) inserting a sensor into the at least one sensor recess;

(c) folding said housing at said hinge region; and (d) sealing said housing in a closed position, wherein said sealing forms the cartridge and the conduit over at least a portion of said sensor.

43. The method of claim 42, wherein the molding comprises injection molding.

44. The method of claim 42, wherein the method further comprises the step of molding a desiccant plastic material into the housing.

45. The method of claim 42, wherein the substantially rigid zone is formed in a first injection molding step and the substantially flexible zone is formed in a second injection molding step.

46. The method of claim 42, wherein the substantially rigid zone or the substantially flexible zone is molded as a single contiguous zone.

47. The method of claim 42, wherein the substantially flexible zone is molded as a plurality of non-contiguous flexible zones.

48. The method of claim 42, wherein the at least one sensor recess is molded in a portion of said substantially flexible zone.

49. The method of claim 42, wherein the at least one sensor recess is in a portion of said substantially rigid zone.

50. The method of claim 42, wherein said substantially rigid zone is molded from PETG.

51. The method of claim 42, wherein the substantially rigid zone is molded from a material selected from the group consisting of ABS, polycarbonate, polystyrene, Topaz, acrylic polymers, PMMA and combinations thereof.

52. The method of claim 42, wherein the substantially flexible zone is molded from a thermoplastic elastomer.

53. The method of claim 42, wherein the substantially flexible zone is molded from an injection moldable thermoplastic elastomer having modulus of elasticity at 100% strain as determined by ASTM D638 of from 0.1 to 6 MPa.

54. The method of claim 42, wherein said housing comprises one or more mating elements on either or both sides of said hinge region, and wherein folding engages the one or more mating elements in a secure manner to form said conduit.

55. The method of claim 54, wherein opposing mating elements may be mated by hot-staking, cold-staking or by a snap closure.

56. The method of claim 54, wherein the one or more mating elements are secured with glue to form said conduit.

57. The method of claim 42, wherein said housing comprises one or more welding regions on either or both sides of said hinge region, and wherein folding engages the one or more welding regions so that they are configured such that they may be welded together in a secure manner to form said conduit.

58. The method of claim 57, wherein said welding is selected from the group consisting of ultrasonic welding, laser welding and thermal welding.

59. The method of claim 42, further comprising inserting a pouch containing a fluid into the housing, before step (c).

60. The method of claim 42, wherein the at least one sensor recess comprises a plurality of recesses each of which contains at least one sensor.

61. A cartridge capable of measuring an analyte or property of a liquid sample, comprising:

(a) a sample entry orifice for receiving the liquid sample;

(b) a top housing portion defining a top portion of a conduit;

(c) a bottom housing portion defining a bottom portion of the conduit, wherein the top portion and the bottom portion are sealed together with one or more mating elements to form the conduit, wherein the top portion or the bottom portion includes a flexible sealing ridge for sealing opposing portions of the conduit, and wherein the top portion and bottom portion are connected to one another by a hinge region, and wherein the cartridge has an unfolded position comprising the to housing portion and the bottom housing portion separated by the hinge region; and (d) a sensor for detecting the analyte or property of the liquid sample.

62. The cartridge of claim 61, wherein said one or more mating elements are matable by hot staking or cold staking.

63. The cartridge of claim 61, wherein said one or more mating elements are snap closures.

64. The cartridge of claim 61, wherein the one or more mating elements comprise one or more welded regions.

65. A molded housing, comprising: a substantially rigid zone, a substantially flexible zone, and a hinge, wherein the housing is foldable at the hinge to form a fluid channel from a top housing portion defining a top portion of the fluid channel and a bottom housing portion defining a bottom portion of the fluid channel, wherein the housing has an unfolded position comprising the top housing portion and the bottom housing portion separated by the hinge, and wherein at least a portion of the substantially flexible zone forms a channel seal.

66. The housing of claim 65, wherein the housing is a two-shot molded housing.

67. The housing of claim 65, wherein at least a portion of the substantially rigid zone is optically transparent.

68. The housing of claim 65, wherein at least a portion of the fluid channel is a cuvette.

69. The housing of claim 65, wherein said fluid channel has reagents for an optical assay.

70. The housing of claim 65, further comprising a sensor.

71. The housing of claim 65, wherein the channel seal is a liquid-tight seal.

72. The housing of claim 65, wherein the channel seal is an air-tight seal.

73. A cartridge, comprising: a molded housing comprising a substantially rigid zone, a substantially flexible zone, and a hinge, wherein the housing is folded about the hinge to form a fluid channel from a top housing portion defining a top portion of the fluid channel and a bottom housing portion defining a bottom portion of the fluid channel, wherein the cartridge has an unfolded position comprising the top housing portion and the bottom housing portion separated by the hinge, and wherein at least a portion of the substantially flexible zone forms a channel seal.

74. The cartridge of claim 73, wherein the molded housing is formed in a two-shot injection molding process.

75. The cartridge of claim 73, wherein at least a portion of the substantially rigid zone is optically transparent.

76. The cartridge of claim 73, wherein at least a portion of the fluid channel is a cuvette.

77. The cartridge of claim 73, wherein said fluid channel has reagents for an optical assay.

78. The cartridge of claim 73, wherein the housing further comprises a sensor.

79. The cartridge of claim 73, wherein the channel seal is a liquid-tight seal.

80. The cartridge of claim 73, wherein the channel seal is an air-tight seal.

81. A method for forming a cartridge, comprising:

(a) providing a molded housing comprising a substantially rigid zone, a substantially flexible zone, and a hinge; and (b) folding the housing at the hinge to form a fluid channel from a top housing portion defining a top portion of the fluid channel and a bottom housing portion defining a bottom portion of the fluid channel, wherein the cartridge has an unfolded position comprising the top housing portion and the bottom housing portion separated by the hinge, and wherein at least a portion of the substantially flexible zone forms a channel seal.

82. The method of claim 81, further comprising the step of forming the molded housing in a two-shot injection molding process.

83. The method of claim 81, wherein at least a portion of the substantially rigid zone is optically transparent.

84. The method of claim 81, wherein at least a portion of the fluid channel is a cuvette.

85. The method of claim 81, wherein said fluid channel has reagents for an optical assay.

86. The method of claim 81, wherein the housing further comprises a sensor.

87. The method of claim 81, wherein the channel seal is a liquid-tight seal.

88. The method of claim 81, wherein the channel seal is an air-tight seal.

* * * * *